US012643330B2

(12) United States Patent
Asao et al.

(10) Patent No.: US 12,643,330 B2
(45) Date of Patent: Jun. 2, 2026

(54) INK JET RECORDING METHOD AND INK JET RECORDING APPARATUS

(71) Applicant: CANON KABUSHIKI KAISHA, Tokyo (JP)

(72) Inventors: Masaya Asao, Kanagawa (JP); Minako Kawabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 18/515,545

(22) Filed: Nov. 21, 2023

(65) Prior Publication Data

US 2024/0173993 A1 May 30, 2024

(30) Foreign Application Priority Data

Nov. 25, 2022 (JP) ................................ 2022-188250
Nov. 10, 2023 (JP) ................................ 2023-191906

(51) Int. Cl.
*B41J 2/18* (2006.01)
*B41M 3/00* (2006.01)

(52) U.S. Cl.
CPC ................ *B41J 2/18* (2013.01); *B41M 3/001* (2013.01)

(58) Field of Classification Search
CPC .................................. B41J 2/18; B41M 3/001
See application file for complete search history.

(56) References Cited

U.S. PATENT DOCUMENTS 7,208,033 B2 4/2007 Kawabe et al.
7,244,299 B2 7/2007 Tsuji et al.
7,297,194 B2 11/2007 Shinjo et al.
7,364,770 B2 4/2008 Nagashima et al.
7,445,666 B2 11/2008 Yanagimachi et al.
7,618,484 B2 11/2009 Fujimoto et al.
7,637,603 B2 12/2009 Kawabe et al.
8,025,722 B2 9/2011 Kawabe et al.
8,070,871 B2 12/2011 Kawabe et al.
8,163,360 B2 4/2012 Asao et al.
8,247,042 B2 8/2012 Asakawa et al.
8,247,043 B2 8/2012 Tanaka et al.
(Continued)

FOREIGN PATENT DOCUMENTS

JP 2017124612 A * 7/2017 ................ B41J 2/14
JP 2020-104487 A 7/2020
JP 2020147707 A * 9/2020

OTHER PUBLICATIONS

English Translation of JP-2017124612-A (Year: 2017).*

*Primary Examiner* — Ricardo I Magallanes
*Assistant Examiner* — Tracey M McMillion
(74) *Attorney, Agent, or Firm* — Venable LLP

(57) ABSTRACT

Provided is an ink jet recording method including using an aqueous ink and a reaction liquid, in which ejection stability of the reaction liquid is excellent and a high-quality image can be recorded. Specifically, provided is an ink jet recording method including recording an image on a recording medium with an aqueous ink and an aqueous reaction liquid. The ink jet recording method includes a reaction liquid applying step and an ink applying step. An ejection head includes: an ejection element substrate including an ejection orifice configured to eject the reaction liquid; and a circulation flow path configured to circulate the reaction liquid between an inside and an outside of the ejection element substrate.

10 Claims, 6 Drawing Sheets

(56) References Cited

U.S. PATENT DOCUMENTS

| | | | |
|---|---|---|---|
| 8,252,393 | B2 | 8/2012 | Nagashima et al. |
| 8,343,269 | B2 | 1/2013 | Takahashi et al. |
| 8,545,008 | B2 | 10/2013 | Asao et al. |
| 8,602,544 | B2 | 12/2013 | Kawabe et al. |
| 8,814,341 | B2 | 8/2014 | Nagao et al. |
| 8,871,013 | B2 | 10/2014 | Sakai et al. |
| 9,574,099 | B2 | 2/2017 | Kawabe et al. |
| 10,093,119 | B2 | 10/2018 | Nagase et al. |
| 10,150,318 | B2 | 12/2018 | Ota et al. |
| 10,166,803 | B2 | 1/2019 | Herlambang et al. |
| 10,233,343 | B2 | 3/2019 | Takebayashi et al. |
| 10,253,200 | B2 | 4/2019 | Kakikawa et al. |
| 10,603,909 | B2 | 3/2020 | Kawabe et al. |
| 10,654,288 | B2 | 5/2020 | Nakata et al. |
| 10,723,135 | B2 | 7/2020 | Kawabe et al. |
| 10,843,482 | B2 | 11/2020 | Aikawa et al. |
| 10,843,483 | B2 | 11/2020 | Saito et al. |
| 10,864,747 | B2 | 12/2020 | Nakagawa et al. |
| 11,124,007 | B2 | 9/2021 | Seguchi |
| 2018/0291217 | A1* | 10/2018 | Kagata .................. C09D 11/10 |
| 2020/0207141 | A1 | 7/2020 | Seguchi |

* cited by examiner

INK JET RECORDING METHOD AND INK JET RECORDING APPARATUS

BACKGROUND OF THE INVENTION

Field of the Invention

The present invention relates to an ink jet recording method and an ink jet recording apparatus.

Description of the Related Art

An ink jet recording method is required to record a high-quality image on various recording medium, for example: a recording medium free of a coating layer such as plain paper; a recording medium including a coating layer, such as ink jet paper or actual printing stock; and a non-absorbent recording medium such as a film. In order to satisfy such requirements, for example, a recording method including using an ink and a reaction liquid containing a reactant that agglomerates components in the ink such as a coloring material has been known.

A method of recording an image with an aqueous ink and a treatment liquid containing a flocculant, the method including ejecting the treatment liquid from a recording head including a circulation flow path to cause the treatment liquid to adhere to a recording medium, has been proposed with a view to improving ejection stability of the treatment liquid (Japanese Patent Application Laid-Open No. 2020-104487).

However, in the case of the recording method as proposed in Japanese Patent Application Laid-Open No. 2020-104487, when a large number of images are recorded, the reaction liquid is continuously ejected for a long period of time, and hence it has been found that the ejection stability of the treatment liquid from the recording head becomes insufficient.

SUMMARY OF THE INVENTION

Accordingly, an object of the present invention is to provide an ink jet recording method including using an aqueous ink and a reaction liquid, in which ejection stability of the reaction liquid is excellent and a high-quality image can be recorded. In addition, another object of the present invention is to provide an ink jet recording apparatus to be used in the ink jet recording method.

That is, according to the present invention, there is provided an ink jet recording method including recording an image on a recording medium with an aqueous ink and an aqueous reaction liquid containing a reactant that reacts with the aqueous ink, the method including: a reaction liquid applying step of applying the reaction liquid to the recording medium by ejecting the reaction liquid from an ejection head of an ink jet system; and an ink applying step of applying the aqueous ink to the recording medium so that a region to which the aqueous ink is applied and a region to which the reaction liquid is applied are at least partially overlap on the recording medium, wherein the ejection head includes: an ejection element substrate including a liquid chamber having an ejection orifice configured to eject the reaction liquid filled inside thereof; and a circulation flow path configured to circulate the reaction liquid between an inside and an outside of the liquid chamber going through the liquid chamber and wherein the circulation flow path includes: an inflow portion configured to flow the reaction liquid into the ejection element substrate; an outflow portion configured to flow the reaction liquid out of the ejection element substrate; a first reaction liquid flow path that is connected from the inflow portion to the outflow portion going through the liquid chamber; and a second reaction liquid flow path that is branched from the first reaction liquid flow path and is connected from the inflow portion to the outflow portion without going through the liquid chamber.

Further features of the present invention will become apparent from the following description of exemplary embodiments with reference to the attached drawings.

DESCRIPTION OF THE EMBODIMENTS

Figure 1:
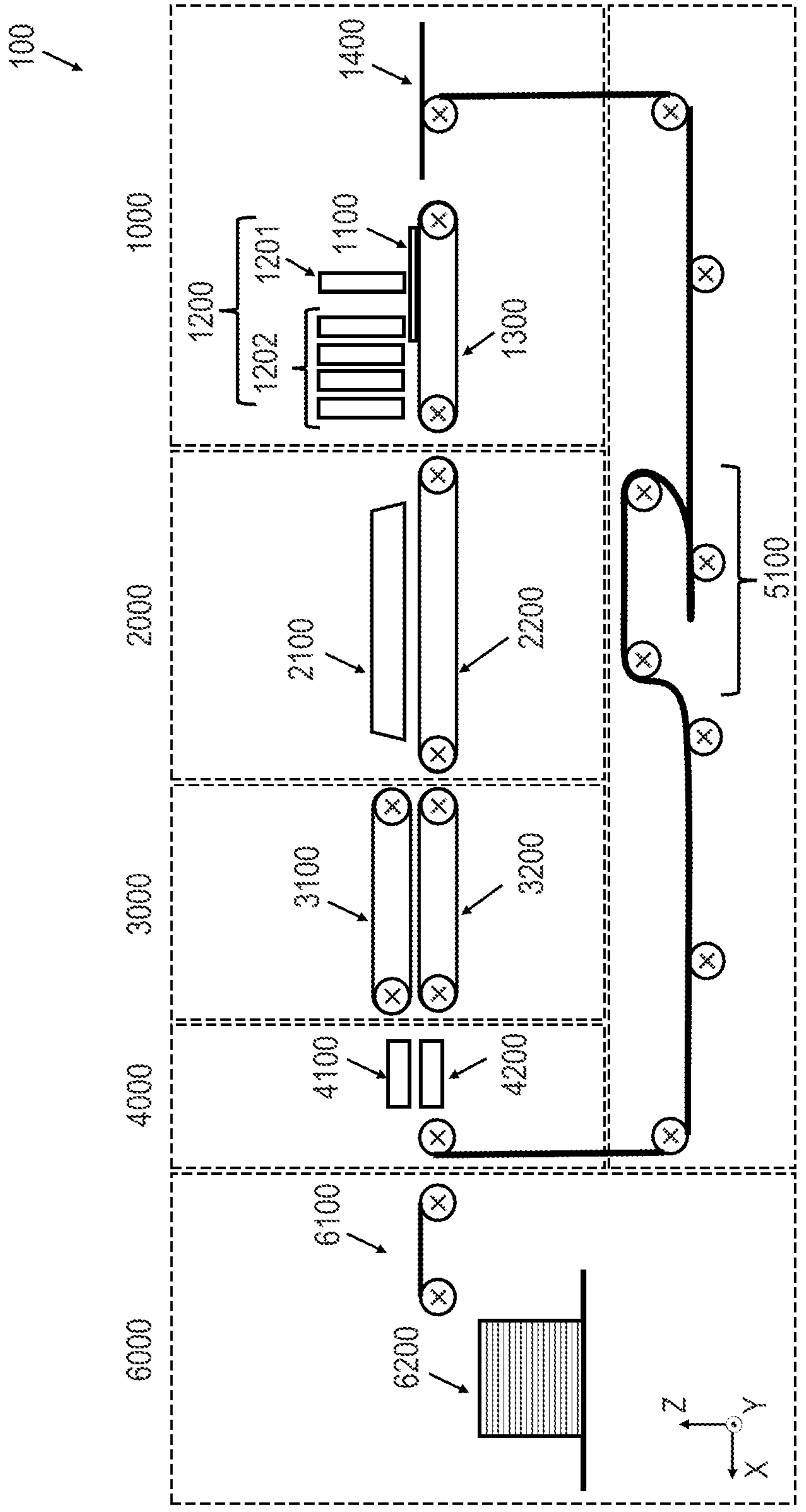
FIG. 1 is a schematic view for illustrating an ink jet recording apparatus according to one embodiment of the present invention.

The present invention is described in more detail below by way of exemplary embodiments. In the present invention, when a compound is a salt, the salt is present as dissociated ions in an ink, but the expression "contain a salt" is used for convenience. In addition, an aqueous ink and reaction liquid for ink jet are sometimes referred to simply as "ink" and "reaction liquid". Physical property values are values at normal temperature (25° C.) and normal pressure (1 atm), unless otherwise stated. The descriptions "(meth)acrylic acid" and "(meth)acrylate" refer to "acrylic acid or methacrylic acid" and "acrylate or methacrylate", respectively.

For example, in an ink jet recording apparatus for commercial use and industrial use, a so-called line type ejection head in which ejection orifices are arranged over the entire region of the maximum width of a recording medium on which an image can be recorded has been adopted and the ink and the reaction liquid are each continuously ejected from the ejection head for a long period of time. While an ink selected from a plurality of inks corresponding to image data is applied as the ink to the recording medium, the reaction liquid is typically applied corresponding to the respective regions to which the plurality of inks is applied. Accordingly, the number of times of ejection from the ejection head of the reaction liquid tends to be larger than that of the ink. Accordingly, the ejection head of the reaction liquid is required to be able to stably eject the reaction liquid from high frequency (when the ejection frequency per unit time is high) to low frequency (when the ejection frequency per unit time is low) in accordance with, for example, an image to be recorded or the kind of the recording medium.

A liquid component such as water (hereinafter sometimes referred to as "moisture") evaporates from an ejection orifice having relatively low ejection frequency out of the ejection orifices arranged on the ejection head while no reaction liquid is ejected. In particular, in the ejection head including a circulation flow path configured to circulate the reaction liquid near the ejection orifice, the reaction liquid that has not evaporated is supplied near the ejection orifice one after another, and hence the amount of the moisture evaporating from the ejection orifice becomes large. Accordingly, it is considered that, in the recording method as proposed in, for example, Japanese Patent Application Laid-Open No. 2020-104487, the moisture evaporation from the ejection orifice is not suppressed, and hence physical properties such as viscosity of the reaction liquid largely change and a component such as a reactant deposits, resulting in a reduction in ejection stability of the reaction liquid. In particular, in the case of the line type ejection head, the ejection orifices are arranged over the entire region of the maximum width of the recording medium, and hence it is hard to frequently perform preliminary ejection as compared to a serial type ejection head. Accordingly, it is important to suppress the reduction in ejection stability of the reaction liquid resulting from the moisture evaporation from the ejection orifice.

In order to stably eject the reaction liquid for a long period of time, changes in physical properties such as an increase in viscosity of the reaction liquid and deposition of a non-volatile solid content such as a reactant each resulting from the moisture evaporation from the ejection orifice are required to be suppressed. An increase in circulation flow rate of the reaction liquid may be effective as an approach to suppressing such changes in physical properties of the reaction liquid and the like. However, when the circulation flow rate of the reaction liquid is simply increased, ejection unevenness is liable to occur owing to the influence of pressure loss that occurs in the flow path in which the reaction liquid flows. In addition, the flow path of the reaction liquid communicating to the ejection orifice is reduced in size and increased in density, and hence it is difficult to simply enlarge an inner diameter of the flow path.

The inventors of the present invention have made an investigation with a view to improving the ejection stability of a reaction liquid in an ink jet recording method including using an aqueous ink and the reaction liquid. As a result, the inventors have found that it is effective to eject the reaction liquid from an ejection head including a circulation flow path including a first reaction liquid flow path going through (via) a liquid chamber having an ejection orifice and a second reaction liquid flow path that is branched from the first reaction liquid flow path and is free from going through the liquid chamber, and thus the inventors have reached the present invention.

In the ink jet recording method of the present invention, the reaction liquid is flowed in the second reaction liquid flow path that is branched from the first reaction liquid flow path and is free from going through the liquid chamber as well as the first reaction liquid flow path going through the liquid chamber. With this configuration, the flow rate of the reaction liquid can be increased even without enlargement of the inner diameter of the flow path while the pressure loss is substantially reduced, and hence the changes in physical properties of the reaction liquid and the deposition of the reactant and the like are suppressed and the ejection stability of the reaction liquid can be improved.

Typically, most of the liquid component such as water in the reaction liquid evaporates from the ejection orifice, and hence, for example, the changes in the physical properties of the reaction liquid are liable to occur in the flow path on a downstream side of the ejection orifice. In contrast, in the ink jet recording method of the present invention, the reaction liquid is flowed also in the second reaction liquid flow path free from going through the liquid chamber having an ejection orifice, and hence, for example, the changes in physical properties of the entire reaction liquid present in the circulation flow path of a liquid supply system of the recording apparatus can be suppressed. With this configuration, the reaction liquid can be stably ejected for a long period of time and a high-quality image can be recorded.

<Ink Jet Recording Method and Ink Jet Recording Apparatus>

An ink jet recording method (hereinafter sometimes referred to simply as "recording method") of the present invention is an ink jet recording method including recording an image on a recording medium with an aqueous ink and an aqueous reaction liquid containing a reactant that reacts with the aqueous ink. The recording method of the present invention includes: a reaction liquid applying step of applying the reaction liquid to the recording medium by ejecting the reaction liquid from an ejection head of an ink jet system; and an ink applying step of applying the aqueous ink to the recording medium so that a region to which the aqueous ink is applied and a region to which the reaction liquid is applied are at least partially overlap on the recording medium. The ejection head includes: an ejection element substrate including a liquid chamber having an ejection orifice configured to eject the reaction liquid filled inside thereof; and a circulation flow path configured to circulate the reaction liquid between an inside and an outside of the liquid chamber going through the liquid chamber. The circulation flow path includes: an inflow portion configured to flow the reaction liquid into the ejection element substrate; and an outflow portion configured to flow the reaction liquid out of the ejection element substrate. The circulation flow path further includes: a first reaction liquid flow path that is connected from the inflow portion to the outflow portion going through the liquid chamber; and a second reaction liquid flow path that is branched from the first reaction liquid flow path and is connected from the inflow portion to the outflow portion without going through the liquid chamber.

An ink jet recording apparatus (hereinafter sometimes referred to simply as "recording apparatus") of the present invention is an ink jet recording apparatus to be used in an ink jet recording method including recording an image on a recording medium with an aqueous ink and an aqueous reaction liquid containing a reactant that reacts with the aqueous ink. The ink jet recording method includes: a reaction liquid applying step of applying the reaction liquid to the recording medium by ejecting the reaction liquid from an ejection head of an ink jet system; and an ink applying step of applying the aqueous ink to the recording medium so that a region to which the aqueous ink is applied and a region to which the reaction liquid is applied are at least partially overlap on the recording medium. The ejection head includes: an ejection element substrate including a liquid chamber having an ejection orifice configured to eject the reaction liquid filled inside thereof; and a circulation flow path configured to circulate the reaction liquid between an inside and an outside of the liquid chamber going through the liquid chamber. The circulation flow path includes: an inflow portion configured to flow the reaction liquid into the ejection element substrate; and an outflow portion configured to flow the reaction liquid out of the ejection element substrate. The circulation flow path further includes: a first reaction liquid flow path that is connected from the inflow portion to the outflow portion going through the liquid chamber; and a second reaction liquid flow path that is branched from the first reaction liquid flow path is connected from the inflow portion to the outflow portion without going through the liquid chamber.

(Ink Jet Recording Apparatus)

Details about the ink jet recording apparatus are described below with reference to the drawings. FIG. 1 is a schematic view for illustrating the ink jet recording apparatus according to one embodiment of the present invention. The ink jet recording apparatus of this embodiment is an ink jet recording apparatus that records an image on a recording medium with a reaction liquid containing a reactant that reacts with an ink and the ink. An X-direction, a Y-direction and a Z-direction represent the width direction (total length direction), depth direction and height direction of the ink jet recording apparatus, respectively. The recording medium is conveyed in the X-direction.

An ink jet recording apparatus 100 of the embodiment illustrated in FIG. 1 includes: a recording portion 1000; a heating portion 2000; a fixing portion 3000; a cooling portion 4000; a reversing portion 5000; and a sheet delivery portion 6000. In the recording portion 1000, various liquids are applied to a recording medium 1100, which has been conveyed from a sheet feeding device 1400 by a conveying member 1300, by a liquid applying device 1200. In the heating portion 2000, the heating of the liquids applied to the recording medium 1100 by a heating device 2100 evaporates volatile components in the liquids such as moisture, to thereby dry the liquids. In the fixing portion 3000, a fixing member 3100 is brought into contact with the region of the recording medium 1100 having applied thereto the liquids to heat the region, to thereby accelerate the fixation of an image to the recording medium 1100. After that, the recording medium 1100 is cooled by the cooling member 4100 of the cooling portion 4000. When an image is to be recorded on the rear surface of the recording medium subsequently to the front surface (recording surface) thereof, first, the recording medium 1100 is reversed by the reversing device 5100 of the reversing portion 5000. Next, after the image has been recorded on the rear surface as in the case of the front surface, the recording medium is conveyed by the conveying member 6100 of the sheet delivery portion 6000 and is loaded and stored in a recording medium storage portion 6200.

Any recording medium may be used as the recording medium 1100. For example, such recording medium each having ink absorbability (permeability) as described below may each be used: a recording medium free of a coating layer, such as plain paper uncoated paper or synthetic paper; and a recording medium including a coating layer, such as actual printing stock, glossy paper or art paper. In addition, a recording medium that does not have permeability like a film or a sheet formed from a resin material, such as polyvinyl chloride (PVC) or polyethylene terephthalate (PET), may be used. The basis weight ($g/m^2$) of the recording medium 1100 is preferably 30 $g/m^2$ or more to 500 $g/m^2$ or less, more preferably 50 $g/m^2$ or more to 450 $g/m^2$ or less.

[Recording Portion]

The recording portion 1000 includes the liquid applying device 1200. The liquid applying device 1200 includes a reaction liquid applying device 1201 and an ink applying device 1202. The reaction liquid applying device 1201 illustrated in FIG. 1 uses an ejection head of an ink jet system. The reaction liquid may be applied by the reaction liquid applying device 1201 before the application of the ink or may be applied after the ink application as long as the liquid can be brought into contact with the ink on the recording medium 1100. However, to record a high-quality image on various recording medium having different liquid-absorbing characteristics, the reaction liquid is preferably applied before the application of the ink. An ejection head (recording head) of an ink jet system is used as the ink applying device 1202. Examples of the ejection system of the ejection head serving as the liquid applying device 1200 may include: a system including causing film boiling in a liquid with an electro-thermal converter to form air bubbles, to thereby eject the liquid; and a system including ejecting the liquid with an electro-mechanical converter.

The liquid applying device 1200 is a line head arranged in the Y-direction in an extended manner and its ejection orifices are arrayed in a range covering the image recording region of the recording medium having the maximum usable width. The ejection head has an ejection orifice surface 1207 (FIG. 3) having formed therein ejection orifices on its lower side (recording medium 1100 side). The ejection orifice surface faces the recording medium 1100 with a minute distance of about several millimeters therebetween.

The plurality of ink applying devices 1202 may be arranged for applying inks of respective colors to the recording medium 1100. For example, when respective color images are recorded with a yellow ink, a magenta ink, a cyan ink and a black ink, the four ink applying devices 1202 that eject the above-mentioned four kinds of inks are arranged side by side in the X-direction. The ink and the reaction liquid are hereinafter sometimes collectively referred to as "liquids".

Figure 2:
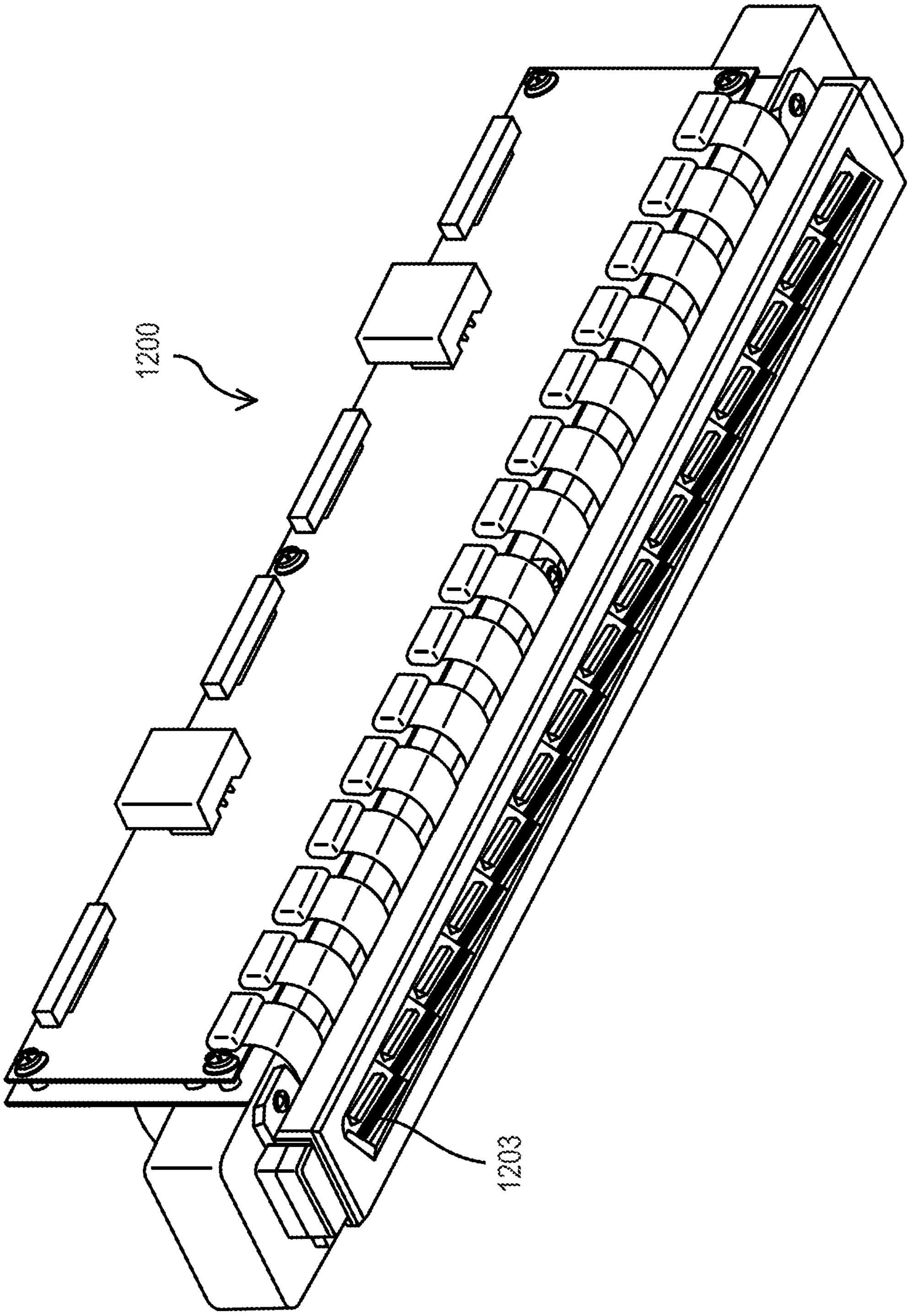
FIG. 2 is a perspective view for illustrating an example of a liquid applying device.

FIG. 2 is a perspective view for illustrating an example of the liquid applying device. The liquid applying device 1200 illustrated in FIG. 2 is a line head and a plurality of ejection element substrates 1203 having arranged therein ejection orifice arrays are linearly arrayed. The ejection element substrates 1203 each have arrayed therein a plurality of ejection orifice arrays.

Figure 3:
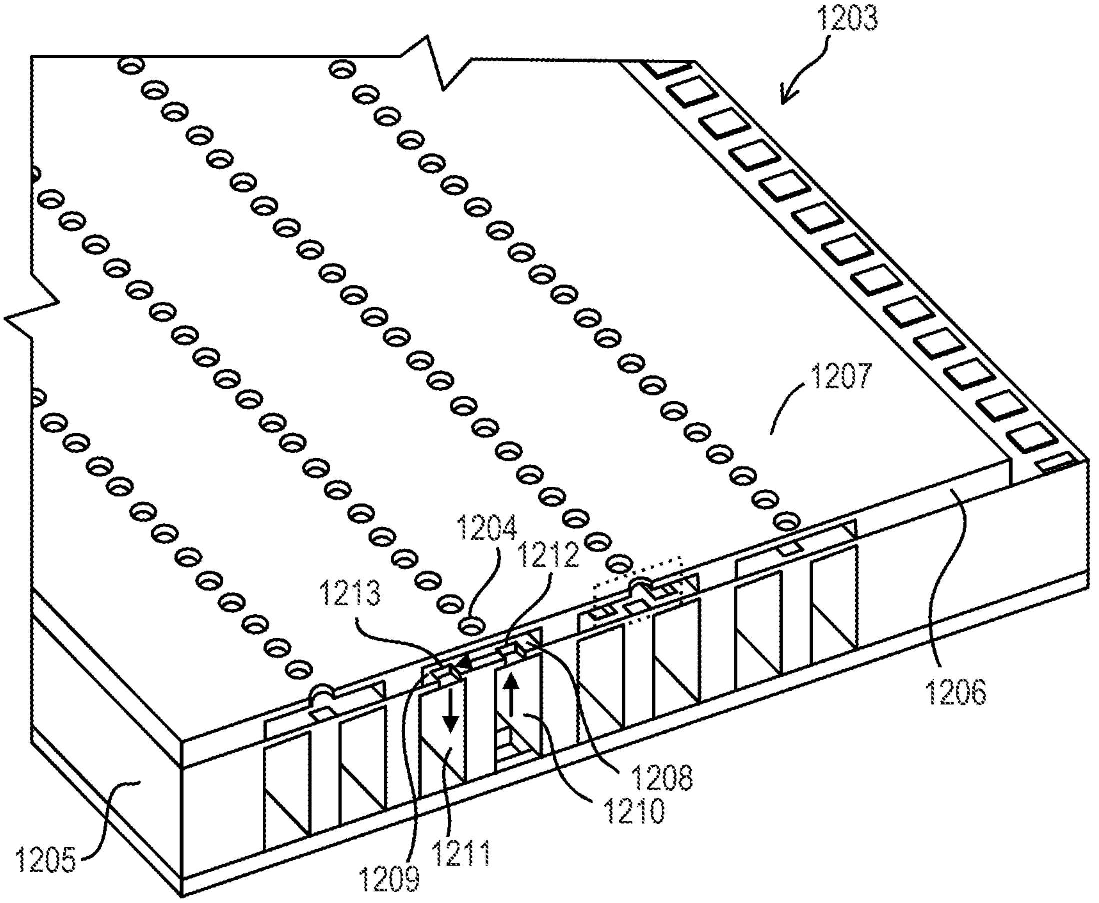
FIG. 3 is a sectional perspective view for illustrating an example of an ejection element substrate.
Figure 4:
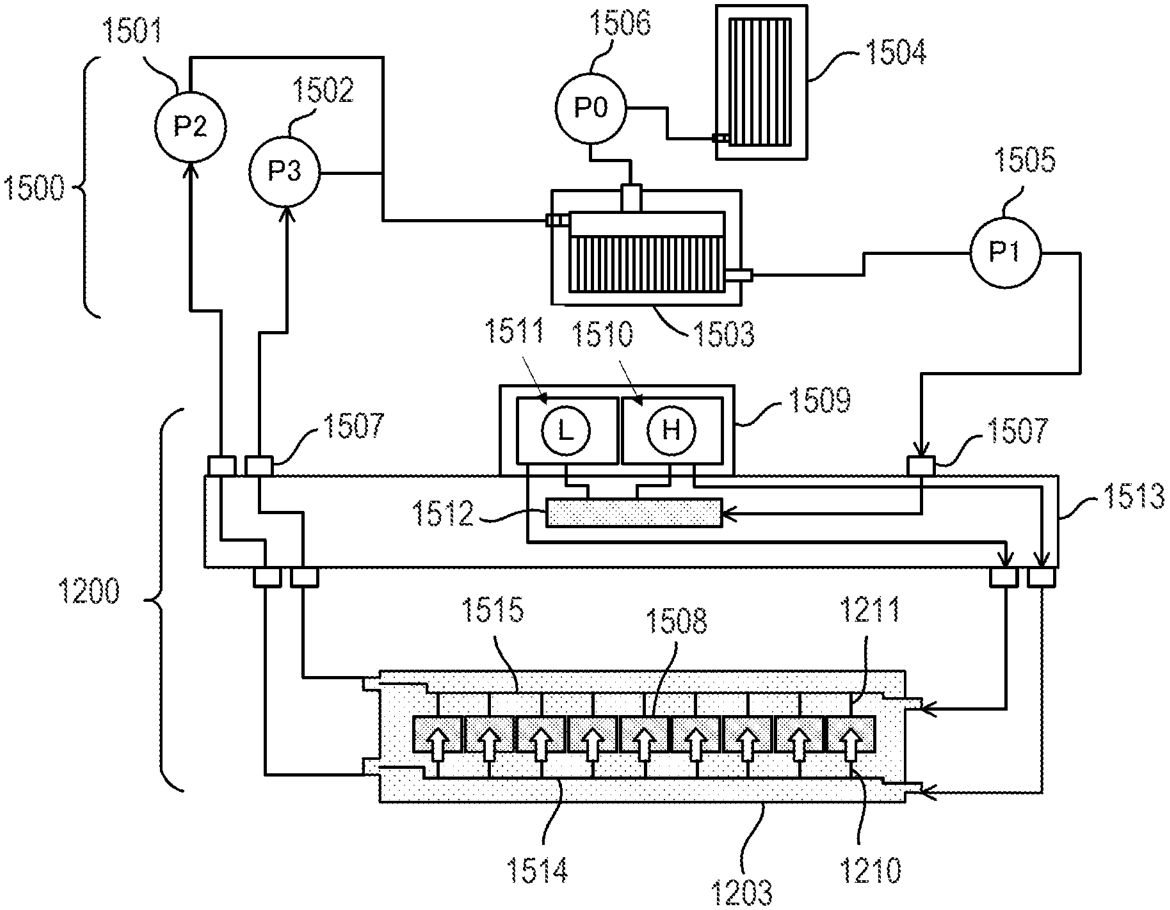
FIG. 4 is a schematic view for illustrating an example of a liquid supply system.

FIG. 3 is a sectional perspective view for illustrating an example of each of the ejection element substrates. The ejection element substrate 1203 illustrated in FIG. 3 includes: an ejection orifice forming member 1206 having opened therein ejection orifices 1204; and a substrate 1205 having arranged thereon an ejection element (not shown). The lamination of the ejection orifice forming member 1206 and the substrate 1205 forms a first flow path 1208 and a second flow path 1209 through which a liquid flows. The first flow path 1208 is a region from an inflow port 1212, into which the liquid flows from an inflow path 1210, to a portion between each of the ejection orifices 1204 and the ejection element (FIG. 4, a liquid chamber 1508). In addition, the second flow path 1209 is a region from the portion between the ejection orifice 1204 and the ejection element (FIG. 4, the liquid chamber 1508) to an outflow port 1213 from which the liquid flows out to an outflow path 1211. For example, when a pressure difference is made between the inflow port 1212 and the outflow port 1213 like the inflow port 1212 having a high pressure and the outflow port 1213 having a low pressure, the liquid can be flowed from the high pressure to the low pressure (in a direction indicated by the arrows in FIG. 3). The liquid that has passed the inflow path 1210 and the inflow port 1212 enters the first flow path 1208. Then, the liquid that has gone through the portion between the ejection orifice 1204 and the ejection element (FIG. 4, the liquid chamber 1508) flows to the outflow path 1211 through the second flow path 1209 and the outflow port 1213.

[Supply System]

FIG. 4 is a schematic view for illustrating an example of a supply system for the liquids such as the ink. A supply portion 1500 of the liquid applying device 1200 illustrated in FIG. 4 includes: a first circulation pump (high-pressure side) 1501; a first circulation pump (low-pressure side)

1502; a sub tank 1503; and a second circulation pump 1505. The sub tank 1503 connected to a main tank 1504 serving as a liquid storage portion has an air communication port (not shown) and hence can discharge air bubbles mixed into a liquid to the outside of a circulation system. The sub tank 1503 is also connected to a replenishment pump 1506. A liquid is consumed in the liquid applying device 1200 by the ejection (discharge) of the liquid from an ejection orifice in, for example, image recording or suction recovery. The replenishment pump 1506 transfers the liquid corresponding to the consumed amount from the main tank 1504 to the sub tank 1503.

The first circulation pump (high-pressure side) 1501 and the first circulation pump (low-pressure side) 1502 each flow the liquid in the liquid applying device 1200 that has been flowed out of a connection portion (inflow portion) 1507 to the sub tank 1503. A positive-displacement pump having a quantitative liquid-delivering ability is preferably used as each of the first circulation pump (high-pressure side) 1501, the first circulation pump (low-pressure side) 1502 and the second circulation pump 1505. Examples of such positive-displacement pump may include a tube pump, a gear pump, a diaphragm pump and a syringe pump. At the time of the driving of each of the ejection element substrates 1203, the liquid can be flowed from a common inflow path 1514 to a common outflow path 1515 by the first circulation pump (high-pressure side) 1501 and the first circulation pump (low-pressure side) 1502.

A negative pressure control unit 1509 includes two pressure adjusting mechanisms in which control pressures different from each other are set. A pressure adjusting mechanism (high-pressure side) 1510 and a pressure adjusting mechanism (low-pressure side) 1511 are connected to the common inflow path 1514 and the common outflow path 1515 in the ejection element substrate 1203 going through a supply unit 1513 having arranged therein a filter 1512 that removes foreign matter from a liquid, respectively. The ejection element substrate 1203 has arranged therein the common inflow path 1514, the common outflow path 1515, and the inflow path 1210 and the outflow path 1211 that communicate to the liquid chamber 1508 serving as a portion between each of the ejection orifices 1204 and the ejection element (not shown). The inflow path 1210 and the outflow path 1211 communicate to the common inflow path 1514 and the common outflow path 1515, respectively. Accordingly, a flow (arrow in FIG. 4) in which part of the liquid passes the inside of the liquid chamber 1508 from the common inflow path 1514 to flow to the common outflow path 1515 occurs. The arrows in FIG. 3 indicate the flow of the liquid in the liquid chamber 1508. That is, as illustrated in FIG. 3, the liquid in the first flow path 1208 flows to the second flow path 1209 going through a space between the ejection orifice 1204 and the ejection element.

The liquid applying device 1200 includes: the ejection element substrate 1203 including the liquid chamber 1508; and a circulation flow path configured to circulate a liquid such as a reaction liquid between the inside and outside of the liquid chamber 1508. The circulation flow path includes a first reaction liquid flow path going through the liquid chamber 1508 and a second reaction liquid flow path free from going through the liquid chamber 1508. The first reaction liquid flow path is a flow path that is connected from an inflow portion configured to flow the liquid into the ejection element substrate 1203 to an outflow portion configured to flow the liquid out of the ejection element substrate 1203 going through the liquid chamber 1508. In contrast, the second reaction liquid flow path is a flow path that is branched from the first reaction liquid flow path and is connected from the inflow portion to the outflow portion without going through the liquid chamber 1508. The reaction liquids that have passed the first reaction liquid flow path and the second reaction liquid flow path are joined in a common outflow path 1515 to be flowed out from the connection portion (outflow portion) 1507. In the illustrated example, the second reaction liquid flow path is branched from the first reaction liquid flow path in the negative pressure control unit 1509. At the time of recording based on the image data (at the time of ejection of the reaction liquid and the ink), a state in which the reaction liquid is flowed in each of the first reaction liquid flow path and the second reaction liquid flow path is preferred. The reaction liquid may also be flowed in each of the first reaction liquid flow path and the second reaction liquid flow path when the recording is paused for a short time period (standby time). When the recording is paused for a long time period, the flow of the reaction liquid may be stopped.

As illustrated in FIG. 4, the pressure adjusting mechanism (high-pressure side) 1510 is connected to the common inflow path 1514 and the pressure adjusting mechanism (low-pressure side) 1511 is connected to the common outflow path 1515. Accordingly, a pressure difference occurs between the inflow path 1210 and the outflow path 1211. That is, the pressure of the reaction liquid that flows in the first reaction liquid flow path going through the liquid chamber 1508 is higher than the pressure of the reaction liquid that flows in the second reaction liquid flow path free from going through the liquid chamber 1508. Thus, a pressure difference also occurs between the inflow port 1212 (FIG. 3) communicating to the inflow path 1210 and the outflow port 1213 (FIG. 3) communicating to the outflow path 1211. When a liquid is flowed by the pressure difference between the inflow port 1212 and the outflow port 1213, the flow rate (mm/s) of the reaction liquid flowing in the first reaction liquid flow path going through the liquid chamber 1508 is preferably controlled to 0.1 mm/s or more to 100.0 mm/s or less. Of those, it is even more preferably controlled to 0.1 mm/s or more to 10.0 mm/s or less. When the flow rate is controlled within the above-mentioned ranges, physical properties of the reaction liquid are maintained within certain ranges, and hence the ejection stability of the reaction liquid can be further improved.

The negative pressure control unit 1509 has a function of working so that the pressure of the flow path in the ejection element substrate 1203 is maintained at a certain pressure set in advance even when the flow rates of the reaction liquid in the respective liquid chambers vary depending on the difference between ejection amounts in the respective ejection orifices 1204 (FIG. 3). The two pressure adjusting mechanisms for forming the negative pressure control unit 1509 may each be a mechanism that can control the variance of a pressure on a downstream side within a certain range including a desired set pressure as its center. A specific example of the pressure adjusting mechanism may be the same mechanism as a so-called “pressure reducing regulator”. With such configuration, a reverse flow of the reaction liquid in the flow path of the ejection element substrate 1203 can be suppressed. In addition, when recording based on the image data is performed, the ejection amount of the reaction liquid differs from one ejection orifice to another. However, the reaction liquid can be uniformly flowed also in the flow path communicating to an ejection orifice from which the reaction liquid is not ejected, and hence, for example, changes in physical properties such as an increase in viscosity of the reaction liquid and deposition of a reactant can be suppressed.

The reaction liquid that flows in the liquid applying device 1200 (in the ejection head) preferably has a temperature of 30° C. or more to 50° C. or less. When the temperature of the reaction liquid is controlled within the above-mentioned range, the physical properties of the reaction liquid can be maintained within a certain range, and hence the ejection stability of the reaction liquid can be further improved.

[Conveyance System]

As illustrated in FIG. 1, the recording portion 1000 includes the liquid applying device 1200 and the conveying member 1300 that conveys the recording medium 1100. The reaction liquid and the ink are applied to the desired positions of the recording medium 1100, which is conveyed by the conveying member 1300, by the liquid applying device 1200. The respective liquid applying devices receive the image signal of recording data to apply the required reaction liquid and ink to the respective positions. Although the conveying member 1300 in the form of a conveying belt is illustrated in FIG. 1, for example, a spur or a conveying cylinder may be utilized as long as the spur or the cylinder has a function of conveying the recording medium 1100. A member that can fix the recording medium 1100 may be used as the conveying member 1300 for improving conveyance accuracy. Specific examples thereof may include: an approach including arranging holes in the conveying member 1300 and sucking the recording medium 1100 from its rear surface side to fix the recording medium; and an approach including forming the conveying member 1300 from an appropriate material and electrostatically adsorbing the recording medium 1100 to fix the recording medium.

[Heating Portion]

As illustrated in FIG. 1, the heating portion 2000 includes the heating device 2100 and a conveying member 2200. The recording medium 1100 having recorded thereon the image through the application of the reaction liquid and the ink is heated by the heating device 2100 while being conveyed by the conveying member 2200. Thus, the liquid components of the image are evaporated and dried. The recording method preferably further includes, between the ink applying step and the fixing step, a drying step of subjecting the recording medium having applied thereto the ink to non-contact heating to dry the ink. The presence of such drying step can effectively suppress the deformation (cockling or curl) of the recording medium 1100.

The heating device 2100 may have any configuration as long as the device can heat the recording medium 1100. Conventionally known various devices, such as a warm-air dryer and a heater, may each be used. Of those, a non-contact-type heater, such as a heating wire and an infrared heater, is preferably utilized in terms of safety and energy efficiency. In addition, the utilization of the following mechanism easily improves the drying efficiency: the mechanism has built therein a fan for jetting a heated gas on the recording medium 1100 and blows warm air thereto.

With regard to a method for the heating, the recording medium 1100 may be heated from the side of the surface (recording surface (front surface)) having applied thereto the reaction liquid and the ink, may be heated from its rear surface side or may be heated from both the surfaces. A heating function may be imparted to the conveying member 2200. Although the conveying member 2200 utilizing a conveying belt are illustrated in FIG. 1, for example, a spur or a conveying cylinder may be utilized as long as the spur or the cylinder has a function of conveying the recording medium 1100. From the viewpoint of suppressing the deformation of the recording medium 1100 by the heating, a configuration, which blows air from the heating portion 2000 to convey the recording medium 1100 while bringing the recording medium into close contact with the conveying member 2200, or a mechanism that fixes the recording medium to the conveying member 2200 is preferably arranged. Specific examples thereof may include: an approach including arranging holes in the conveying member 2200 and sucking the recording medium 1100 from its rear surface side to fix the recording medium; and an approach including forming the conveying member 2200 from an appropriate material and electrostatically adsorbing the recording medium 1100 to fix the recording medium.

A heating temperature is preferably set so that a liquid component may be quickly evaporated and so that the recording medium 1100 may not be overdried from the viewpoint of suppressing the deformation of the recording medium 1100. In view of a conveying speed and an environmental temperature, the temperature of a drying unit may be set so that the recording medium may have a desired temperature. Specifically, the temperature of the drying unit (e.g., warm air) is set to preferably 40° C. or more to 100° C. or less, more preferably 60° C. or more to 80° C. or less. In addition, when a heated gas is blown to heat the recording medium 1100, an air speed is preferably set to 1 m/s or more to 100 m/s or less. The temperature of air such as warm air may be measured with a K-type thermocouple thermometer. A measuring machine may be specifically, for example, a machine available under the product name "AD-5605H" (manufactured by A&D Company, Limited).

Figure 5:
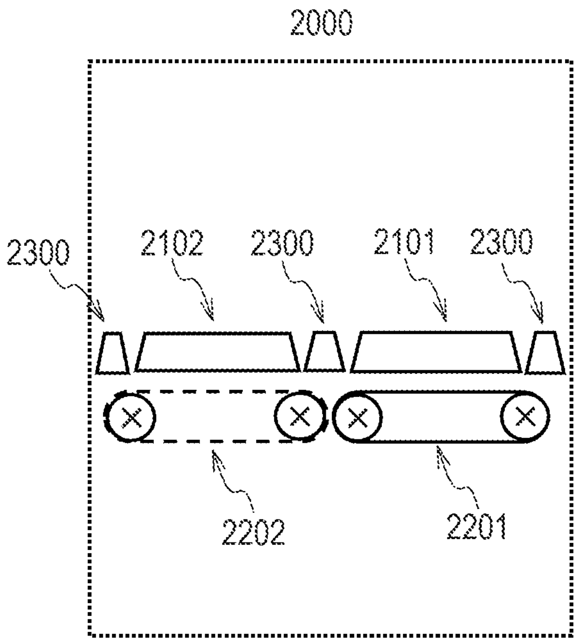
FIG. 5 is a schematic view for illustrating another example of a heating portion.

FIG. 5 is a schematic view for illustrating another example of the heating portion. Herein, a difference from the heating portion described in FIG. 1 and the foregoing is described. The heating portion 2000 illustrated in FIG. 5 includes: a first heating device 2101 and a second heating device 2102; and a first conveying member 2201 and a second conveying member 2202 arranged to face the first heating device 2101 and the second heating device 2102, respectively.

A mechanism that sucks and fixes the recording medium 1100 is not arranged in the first conveying member 2201. In addition, warm air from the first heating device 2101 presses the recording medium 1100 against the first conveying member 2201, to thereby convey the recording medium 1100. Thus, the recording medium 1100 can be delivered from the conveying member 1300 (FIG. 1) to the first conveying member 2201 and from the first conveying member 2201 to the second conveying member 2202 with high accuracy. Further, a conveyance shift due to a slight difference in conveying speed between the conveying member 1300 (FIG. 1) and the first conveying member 2201 can be reduced. Meanwhile, a conveying belt having arranged therein holes that can pass a gas therethrough is utilized as the second conveying member 2202 and the recording medium 1100 is conveyed while being fixed to the second conveying member 2202 going through a suction mechanism (not shown).

Air knives 2300 are arranged between the conveying member 1300 (FIG. 1) and the first conveying member 2201, between the first conveying member 2201 and the second conveying member 2202 and between the second conveying member 2202 and a conveying member 3200 (FIG. 1), respectively. The lifting of the tip portion of the recording medium 1100, which has been conveyed, is pressed down with an air pressure from the air knives 2300.

Thus, the collision of the tip portion of the recording medium 1100 with the first heating device 2101, the second heating device 2102 and the fixing member 3100 (FIG. 1) is avoided and hence the occurrence of a conveyance failure can be suppressed.

The first heating device 2101 and the second heating device 2102 may each have the same configuration as that of the above-mentioned heating device 2100. The temperatures of the first heating device 2101 and the second heating device 2102 may be identical to or different from each other. The air speeds of heated gases when the gases are blown from the devices to heat the recording medium may also be identical to or different from each other. In addition, the recording medium may be heated from the first conveying member 2201 and the second conveying member 2202 as required.

[Fixing Portion]

As illustrated in FIG. 1, the fixing portion 3000 is a contact-type heating and pressurizing mechanism including the fixing member 3100 serving as a fixing belt such as an endless belt and the conveying member 3200. In the fixing portion 3000, the recording medium 1100 is conveyed by the conveying member 3200. In addition, the fixing member 3100 is brought into contact with the recording medium 1100 under a state in which the recording medium is pressurized to heat the liquids applied to the recording medium 1100, such as the reaction liquid and the ink. Thus, an image can be fixed to the recording medium 1100. After the permeation of the liquid components of the reaction liquid and the ink into the recording medium 1100 having recorded thereon the image and the evaporation thereof from the recording medium 1100 by their passing through the heating portion 2000, the reaction liquid and the ink are fixed in the fixing portion 3000 to complete the image. When the recording medium 1100 is heated and pressurized under the state of being sandwiched between the fixing member 3100 and the conveying member 3200, the image on the recording medium 1100 and the fixing member 3100 are brought into close contact with each other and hence the image is fixed to the recording medium 1100. When a liquid such as an ink containing the resin particle and a coloring material is used, the resin particle is softened going through heating mainly by the fixing portion 3000 to form a film and hence the coloring material can be bound onto the recording medium 1100.

A method of heating the fixing member 3100 may be, for example, a system including arranging a heat source such as a halogen heater in each of rollers that drive the fixing member 3100 serving as a fixing belt to heat the member. In addition, the method may be, for example, a system including arranging a heat source such as an infrared heater at a site different from the fixing member 3100 to heat the member. Further, those systems may be combined with each other. The conveying member 3200 may be heated as required. In view of a conveying speed and an environmental temperature, the temperature of the fixing member 3100 may be set so that the surface of the recording medium may have a desired temperature. Specifically, the temperature of the fixing member 3100 is set to preferably 50° C. or more to 120° C. or less, more preferably 60° C. or more to 110° C. or less. The temperature of the contact-type heating and pressurizing mechanism (fixing member 3100) and the surface temperature of the recording medium immediately after its passing through the contact-type heating and pressurizing mechanism may each be measured with a radiation thermometer. The radiation thermometer only needs to be arranged near an end portion (terminal) of the contact-type heating and pressurizing mechanism. The radiation thermometer may be specifically, for example, a thermometer available under the product name "RADIATION THERMOMETER IT-545S" (manufactured by Horiba, Ltd.).

In the case where the liquid (ink) includes the resin particle, when the temperature of the fixing member 3100 is set to a temperature equal to or more than the glass transition temperature of the resin particle in the liquid (ink), the resin particle easily softens to form a film and hence the abrasion resistance of the image can be improved. When the liquid (ink) includes a wax particle, the temperature of the fixing member 3100 is preferably set to be lower than the melting point of a wax for forming the wax particle. Thus, the wax that is suppressed from melting easily remains on the surface of the image and hence the abrasion resistance of the image can be improved.

A nip pressure between the fixing member 3100 and the conveying member 3200, that is, a pressure to be applied to the recording medium when the recording medium passes the contact-type heating and pressurizing mechanism is set to preferably 10 Pa or more to 1,000 Pa or less, more preferably 10 Pa or more to 500 Pa or less. In addition, the pressure is particularly preferably set to 10 Pa or more to 400 Pa or less. A time period (nip time) required for the recording medium to pass the contact-type heating and pressurizing mechanism is preferably 0.25 second or more to 5.0 seconds or less, more preferably 0.5 second or more to 4.0 seconds or less, particularly preferably 1.0 second or more to 3.0 seconds or less.

Figure 6:
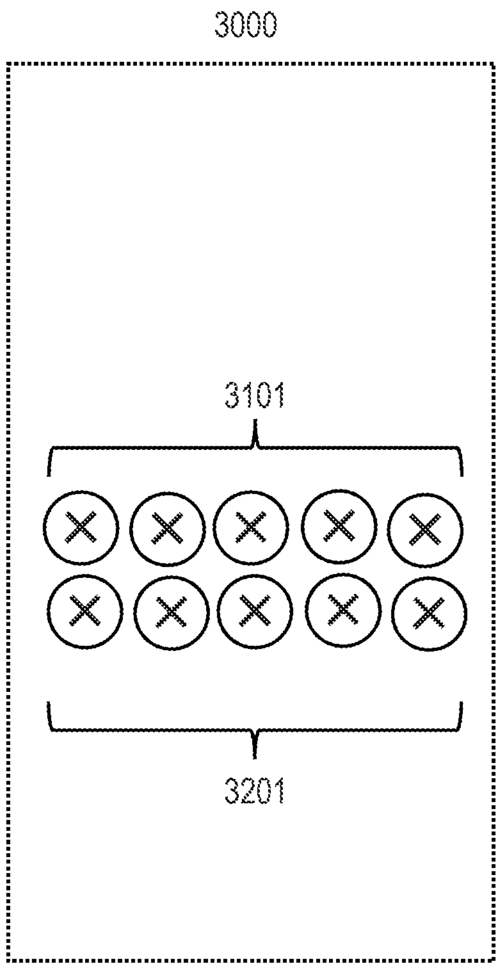
FIG. 6 is a schematic view for illustrating another example of a fixing portion.

FIG. 6 is a schematic view for illustrating another example of the fixing portion. Herein, a difference from the fixing portion described in FIG. 1 and the foregoing is described. The fixing portion 3000 illustrated in FIG. 6 is a contact-type heating and pressurizing mechanism including a plurality of fixing rollers 3101 and a plurality of conveying members 3201 arranged to face these fixing rollers 3101. When the recording medium 1100 having applied thereto the liquids such as the ink passes a space between the fixing rollers 3101 and the conveying members 3201, an image is fixed to the recording medium. The extent to which the image is fixed to the recording medium may be adjusted by controlling, for example, the numbers of the fixing rollers 3101 and the conveying members 3201, the time period for which the recording medium is nipped by the rollers and the members, a temperature and a pressure.

[Cooling Portion]

The cooling portion 4000 includes the cooling member 4100 and a conveying member 4200 (FIG. 1). The cooling portion 4000 cools the recording medium 1100 that has passed the heating portion 2000 and the fixing portion 3000 to have a high temperature. The cooling member 4100 may have any configuration as long as the member can cool the recording medium 1100. Approaches, such as air cooling and water cooling, may each be utilized. Of those, an approach including blowing a gas that is not heated is preferred in terms of safety and energy efficiency. In addition, the utilization of the following mechanism easily improves cooling efficiency: the mechanism has built therein a fan for jetting a gas on the recording medium 1100 and blows air thereto. In view of a conveying speed and an environmental temperature, the temperature of a cooling unit may be set so that the image of the recording medium may have a desired temperature. Specifically, the temperature of the cooling unit (e.g., blowing) is set to preferably 20° C. or more to 60° C. or less, more preferably 25° C. or more to 50° C. or less. When a gas is blown to cool the recording medium, its air speed is preferably set to 1 m/s or more to 100 m/s or less. The adoption of such conditions can suppress the deformation of the recording medium 1100 to be loaded in the sheet delivery portion 6000 to be described later and the sticking (blocking) of the image.

[Reversing Portion]

When double-sided recording is performed, the recording medium 1100 is reversed through utilization of the reversing portion 5000 (FIG. 1). The recording medium 1100 having the image recorded on its recording surface (front surface) passes the cooling portion 4000 and is then diverged and conveyed, followed by reversal by a reversing device 5100. The recording medium 1100 that has been reversed is conveyed to the sheet feeding device 1400 of the recording portion 1000 under a state in which the liquids are applied to its rear surface (surface opposite to the recording surface (front surface)).

[Sheet Delivery Portion]

The recording medium 1100 after the image recording is stored in the sheet delivery portion 6000 (FIG. 1). The recording medium 1100 that has passed the cooling portion 4000 after the performance of single-sided recording or double-sided recording is conveyed by the conveying member 6100 to be finally stored under the state of being loaded in the recording medium storage portion 6200. The two or more recording medium storage portions 6200 may be arranged for, for example, separately storing different recorded products.

<Reaction Liquid>

The recording method of the present invention includes the reaction liquid applying step of applying the reaction liquid to the recording medium by ejecting the reaction liquid from an ejection head of an ink jet system. Respective components to be used in the reaction liquid and the like are described in detail below.

[Reactant]

The reaction liquid is brought into contact with the ink to react with the ink, to thereby aggregate components (a resin, a surfactant, and a component having an anionic group such as a self-dispersible pigment) in the ink. The reaction liquid contains the reactant. When the reactant is present, at the time of contact between the ink and the reactant in the recording medium, the state of presence of the component having an anionic group in the ink is destabilized and hence the aggregation of the ink can be accelerated. Examples of the reactant may include: a polyvalent metal ion; a cationic component such as a cationic resin; and an organic acid. The reactants may be used alone or in combination thereof. However, in the present invention, the reaction liquid is preferably free of a large amount of the resin. When the reaction liquid contains the resin, the content (% by mass) of the resin in the reaction liquid is preferably 1.5% by mass or less with respect to the total mass of the reaction liquid. The reaction liquid is more preferably free of the resin.

Examples of the polyvalent metal ion forming a polyvalent metal salt may include: divalent metal ions, such as $Ca^{2+}$, $Cu^{2+}$, $Ni^{2+}$, $Mg^{2+}$, $Sr^{2+}$, $Ba^{2+}$ and $Zn^{2+}$; and trivalent metal ions, such as $Fe^{3+}$, $Cr^{3+}$, $Y^{3+}$ and $Al^{3+}$. A water-soluble polyvalent metal salt (which may be a hydrate) made up of the polyvalent metal ion and an anion bonded to each other may be used to incorporate the polyvalent metal ion into the reaction liquid. Examples of such anion may include: inorganic anions, such as $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $PO_4^{3-}$, $HPO_4^{2-}$ and $H_2PO_4^-$; and organic anions, such as $HCOO^-$, $(COO^-)_2$, $COOH(COO^-)$, $CH_3COO^-$, $CH_3CH(OH)COO^-$, $C_2H_4(COO^-)_2$, $C_6H_5COO^-$, $C_6H_4(COO^-)_2$ and $CH_3SO_3^-$. When the polyvalent metal ion is used as the reactant, its content (% by mass) in terms of polyvalent metal salt in the reaction liquid is preferably 1.0% by mass or more to 20.0% by mass or less with respect to the total mass of the reaction liquid. In this specification, when the polyvalent metal salt is a hydrate, the "content (% by mass) of the polyvalent metal salt" in the reaction liquid means the "content (% by mass) of the anhydride of the polyvalent metal salt" obtained by removing water serving as a hydrate.

The reaction liquid containing the organic acid has a buffering capacity in an acidic region (at a pH of less than 7.0, preferably at a pH of from 2.0 to 5.0) to efficiently turn the anionic group of the components present in the ink into an acid type, to thereby aggregate the ink. Examples of the organic acid may include: monocarboxylic acids, such as formic acid, acetic acid, propionic acid, butyric acid, benzoic acid, glycolic acid, lactic acid, salicylic acid, pyrrolecarboxylic acid, furancarboxylic acid, picolinic acid, nicotinic acid, thiophenecarboxylic acid, levulinic acid and coumalic acid, and salts thereof; dicarboxylic acids, such as oxalic acid, malonic acid, succinic acid, glutaric acid, adipic acid, maleic acid, fumaric acid, itaconic acid, sebacic acid, phthalic acid, malic acid and tartaric acid, and salts and hydrogen salts thereof; tricarboxylic acids, such as citric acid and trimellitic acid, and salts and hydrogen salts thereof; and tetracarboxylic acids such as pyromellitic acid, and salts and hydrogen salts thereof. When the organic acid is used as the reactant, the content (% by mass) of the organic acid in the reaction liquid is preferably 1.0% by mass or more to 50.0% by mass or less with respect to the total mass of the reaction liquid.

Examples of the cationic resin may include resins having structures of primary to tertiary amines and resins having structures of quaternary ammonium salts. Specific examples thereof may include resins having structures of, for example, vinylamine, allylamine, vinylimidazole, vinylpyridine, dimethylaminoethyl methacrylate, ethylene imine, guanidine, diallyldimethylammonium chloride and an alkylamine-epichlorohydrin condensate. To improve solubility in the reaction liquid, the cationic resin and an acidic compound may be used in combination or the cationic resin may be subjected to quaternization treatment. When the cationic resin is used as the reactant, the content (% by mass) of the cationic resin in the reaction liquid is preferably 0.1% by mass or more to 10.0% by mass or less with respect to the total mass of the reaction liquid.

The reactant is preferably a component that is solid at 25° C. An example of the component that is solid at 25° C. (reactant) may be a polyvalent metal salt. The component that is solid at 25° C. to be used as the reactant is likely to be present near the surface of the recording medium even when the liquid component permeates the recording medium, and can efficiently agglomerate the component in the ink even when the application amount of the reaction liquid is small. Accordingly, cockling of the recording medium that is liable to occur through the application of the reaction liquid can be effectively suppressed. In addition, the saturation solubility of the reactant is preferably 20 g or more with respect to 100 g of water at 25° C. When the reactant having a saturation solubility that falls within the above-mentioned range is used, the deposition of the reactant in the flow path can be further suppressed. Of the polyvalent metal salts having the above-mentioned characteristics, magnesium sulfate, magnesium nitrate and calcium nitrate are preferred and magnesium sulfate is more preferred.

The content (% by mass) of the component that is solid at 25° C. to be used as the reactant in the reaction liquid is preferably 10.0% by mass or more with respect to the total mass of the reaction liquid. When the content of the component that is solid at 25° C. to be used as the reactant falls within the above-mentioned range, the component in the ink can be efficiently agglomerated even when the application amount of the reaction liquid is small. With this configuration, cockling of the recording medium that is liable to occur through the application of the reaction liquid can be effectively suppressed. The content (% by mass) of the component that is solid at 25° C. to be used as the reactant in the reaction liquid is preferably 30.0% by mass or less with respect to the total mass of the reaction liquid.

[Aqueous Medium]

The reaction liquid is an aqueous reaction liquid containing at least water as an aqueous medium. Examples of the aqueous medium to be used in the reaction liquid may include the same examples as those of an aqueous medium that can be incorporated into the ink to be described later. A water-soluble organic solvent to be described later that can be incorporated into the ink may be incorporated into the aqueous medium to be used in the reaction liquid. The water-soluble organic solvent preferably contains a specific water-soluble hydrocarbon compound to be described later. The content (% by mass) of the water-soluble organic solvent in the reaction liquid is preferably 1.0% by mass or more to 45.0% by mass or less with respect to the total mass of the reaction liquid. In addition, the content (% by mass) of the water in the reaction liquid is preferably 50.0% by mass or more to 95.0% by mass or less with respect to the total mass of the reaction liquid.

[Water-Soluble Hydrocarbon Compound]

The water-soluble organic solvent to be incorporated into the reaction liquid preferably contains a specific water-soluble hydrocarbon compound. The water-soluble hydrocarbon compound is a compound having a hydrocarbon chain having 3 or more carbon atoms, the compound being substituted with 2 or more hydrophilic groups each selected from the group consisting of: a hydroxy group; an amino group; and an anionic group. However, the hydrocarbon chain may be interrupted by a sulfonyl group or an ether group. When the number of the carbon atoms of the hydrocarbon chain is 3 or 4, the hydrophilic groups include an anionic group or the hydrocarbon chain is interrupted by a sulfonyl group.

In the present invention, a hydrocarbon compound in the state of being dissolved in water at a content of the compound in the reaction liquid at 25° C. is defined as being "water-soluble". That is, the solubility of the compound in water at 25° C. is larger than the content thereof in the reaction liquid. The fact that the hydrocarbon chain is interrupted by a sulfonyl group or an ether group means that a sulfonyl group (—S(═O)$_2$—) or an ether group (—O—) is present in the middle of the hydrocarbon chain. The water-soluble hydrocarbon compound has hydrogen-bonding groups, such as a hydroxy group, an amino group, an anionic group, a sulfonyl group and an ether group. Accordingly, the use of the reaction liquid including the hydrocarbon compound can suppress the cockling or curl of a recording medium having recorded thereon an image. A general hydrocarbon compound having a hydrocarbon chain having a relatively small number of carbon atoms (3 or 4 carbon atoms) tends to have a small molecular weight and hence have a low vapor pressure. However, the above-mentioned water-soluble hydrocarbon compound has a hydrogen-bonding anionic group or its hydrocarbon chain is interrupted by a sulfonyl group. Accordingly, the compound hardly evaporates owing to an intermolecular or intramolecular interaction and hence remains between fibers for forming the recording medium to exhibit a suppressing action on the cockling or the curl. The content (% by mass) of the water-soluble hydrocarbon compound in the reaction liquid is preferably 1.0% by mass or more to 20.0% by mass or less with respect to the total mass of the ink.

The number of the carbon atoms of the hydrocarbon chain for forming the water-soluble hydrocarbon compound is preferably 3 or more to 50 or less, more preferably 3 or more to 10 or less. Examples of the anionic group may include a sulfonic acid group and a carboxylic acid group. Specific examples of the water-soluble hydrocarbon compound may include: alkanediols, such as 1,5-pentanediol and 1,6-hexanediol; amino acids, such as alanine, β-alanine, trimethylglycine, amidosulfuric acid (alias: sulfamic acid), aminomethanesulfonic acid, taurine (alias: 2-aminoethanesulfonic acid), carbamic acid, glycine, aspartic acid, glutamic acid, sulfanilic acid or salts of any of the acids described above, phenylalanine, leucine, isoleucine, threonine, tryptophan, valine, methionine, lysine and arginine; sulfonyl compounds such as bis(2-hydroxyethyl) sulfone; alkylene glycols, such as triethylene glycol, tetraethylene glycol, tripropylene glycol and a polyethylene glycol having a number-average molecular weight of from about 200 to about 1,000; and sugars, such as sorbitol, D-sorbitol, xylitol, trehalose, fructose and D(+)-xylose. The water-soluble hydrocarbon compounds may be used alone or in combination thereof.

The reaction liquid preferably contains a water-soluble hydrocarbon compound that is solid at 25° C. With this configuration, the content of water in the reaction liquid is relatively reduced, and hence the cockling can be effectively suppressed. Preferred examples of the water-soluble hydrocarbon compound that is solid at 25° C. include amidosulfuric acid (sulfamic acid), glycine, alanine, β-alanine, trimethylglycine, arginine, sorbitol, D-sorbitol, γ-aminobutyric acid, L-proline, meglumine, xylitol, fructose, isosorbide, trimethylolethane, tris(hydroxymethyl)aminomethane, trehalose, fructose and D(+)-xylose.

The content (% by mass) of the component that is solid at 25° C. in the reaction liquid is preferably 20.0% by mass or more with respect to the total mass of the reaction liquid. The "component that is solid at 25° C." in the reaction liquid encompasses, for example, the above-mentioned component that is solid at 25° C. to be used as the reactant and the above-mentioned water-soluble hydrocarbon compound that is solid at 25° C. When the content of the component that is solid at 25° C. in the reaction liquid falls within the above-mentioned range, the content of water in the reaction liquid is relatively reduced, and hence the cockling can be further effectively suppressed. The content (% by mass) of the component that is solid at 25° C. in the reaction liquid is preferably 50.0% by mass or less with respect to the total mass of the reaction liquid.

[Other Component]

The reaction liquid may contain various other components as required. Examples of the other components may include the same examples as those of other components that can be incorporated into the ink to be described later.

[Physical Properties of Reaction Liquid]

The reaction liquid is an aqueous reaction liquid to be applied to an ink jet system. Accordingly, from the viewpoint of reliability, it is preferred that the physical property values of the reaction liquid be appropriately controlled. Specifically, the surface tension of the reaction liquid at 25° C. is preferably 20 mN/m or more to 60 mN/m or less. In addition, the viscosity of the reaction liquid at 25° C. is preferably 1.0 mPa·s or more to 10.0 mPa·s or less. The pH of the reaction liquid at 25° C. is preferably 5.0 or more to 9.5 or less, more preferably 6.0 or more to 9.0 or less.

<Ink>

The ink to be used in the recording method of the present invention is an aqueous ink for ink jet. Respective components to be used in the ink and the like are described in detail below.

[Coloring Material]

The ink preferably includes the coloring material. A pigment or a dye may be used as the coloring material. The content (% by mass) of the coloring material in the ink is preferably 0.5% by mass or more to 15.0% by mass or less, more preferably 1.0% by mass or more to 10.0% by mass or less with respect to the total mass of the ink.

Specific examples of the pigment may include: inorganic pigments, such as carbon black and titanium oxide; and organic pigments, such as azo, phthalocyanine, quinacridone, isoindolinone, imidazolone, diketopyrrolopyrrole and dioxazine pigments. The pigments may be used alone or in combination thereof.

A resin-dispersed pigment using a resin as a dispersant, a self-dispersible pigment, which has a hydrophilic group bonded to its particle surface, or the like may be used as a dispersion system for the pigment. In addition, a resin-bonded pigment having a resin-containing organic group chemically bonded to its particle surface, a microcapsule pigment, which contains a particle whose surface is covered with, for example, a resin, or the like may be used. Pigments different from each other in dispersion system out of those pigments may be used in combination. Of those, not a resin-bonded pigment or a microcapsule pigment but a resin-dispersed pigment having a resin serving as a dispersant, the resin being caused to physically adsorb to its particle surface, is preferably used.

A dispersant that can disperse the pigment in an aqueous medium through the action of an anionic group is preferably used as a resin dispersant for dispersing the pigment in the aqueous medium. A resin having an anionic group may be used as the resin dispersant and such a resin as described later, in particular, a water-soluble resin is preferably used. The mass ratio of the content (% by mass) of the pigment in the ink to the content (% by mass) of the resin dispersant therein is preferably 0.3 times or more to 10.0 times or less.

A pigment having an anionic group, such as a carboxylic acid group, a sulfonic acid group or a phosphonic acid group, bonded to its particle surface directly or through any other atomic group (—R—) may be used as the self-dispersible pigment. The anionic group may be any one of an acid type or a salt type. When the group is a salt type, the group may be in any one of a state in which part of the group dissociates or a state in which the entirety thereof dissociates. When the anionic group is a salt type, examples of a cation serving as a counterion may include an alkali metal cation, ammonium and an organic ammonium. Specific examples of the other atomic group (—R—) may include: a linear or branched alkylene group having 1 to 12 carbon atoms; an arylene group, such as a phenylene group or a naphthylene group; a carbonyl group; an imino group; an amide group; a sulfonyl group; an ester group; and an ether group. In addition, groups obtained by combining those groups may be adopted.

A dye having an anionic group is preferably used as the dye. Specific examples of the dye may include dyes, such as azo, triphenylmethane, (aza)phthalocyanine, xanthene and anthrapyridone dyes. The dyes may be used alone or in combination thereof. The coloring material is preferably a pigment, more preferably a resin-dispersed pigment or a self-dispersible pigment.

[Resin]

A resin may be incorporated into the ink. The use of the ink including the resin can record an image improved in abrasion resistance. The resin may be added to the ink (i) for stabilizing the dispersed state of the pigment, that is, as a resin dispersant or an aid therefor. In addition, the resin may be added to the ink (ii) for improving the various characteristics of an image to be recorded.

The content (% by mass) of the resin in the ink is preferably 0.1% by mass or more to 20.0% by mass or less, more preferably 0.5% by mass or more to 15.0% by mass or less with respect to the total mass of the ink. Examples of the form of the resin may include a block copolymer, a random copolymer, a graft copolymer and a combination thereof. In addition, the resin may be a water-soluble resin that can be dissolved in an aqueous medium or may be a resin particle to be dispersed in the aqueous medium. The resins may be used alone or in combination thereof.

[Composition of Resin]

Examples of the resin may include an acrylic resin, a urethane-based resin and an olefin-based resin. Of those, an acrylic resin and a urethane-based resin are preferred and an acrylic resin including a unit derived from (meth)acrylic acid or a (meth)acrylate is more preferred.

A resin having a hydrophilic unit and a hydrophobic unit as its structural units is preferred as the acrylic resin. Of those, a resin having a hydrophilic unit derived from (meth) acrylic acid and a hydrophobic unit derived from at least one of a monomer having an aromatic ring and a (meth)acrylic acid ester-based monomer is preferred. A resin having a hydrophilic unit derived from (meth)acrylic acid and a hydrophobic unit derived from at least one monomer of styrene and α-methylstyrene is particularly preferred. Those resins may each be suitably utilized as a resin dispersant for dispersing the pigment because the resins each easily cause an interaction with the pigment.

The hydrophilic unit is a unit having a hydrophilic group such as an anionic group. The hydrophilic unit may be formed by, for example, polymerizing a hydrophilic monomer having a hydrophilic group. Specific examples of the hydrophilic monomer having a hydrophilic group may include: acidic monomers each having a carboxylic acid group, such as (meth)acrylic acid, itaconic acid, maleic acid and fumaric acid; and anionic monomers, such as anhydrides and salts of these acidic monomers. A cation for forming the salt of the acidic monomer may be, for example, a lithium, sodium, potassium, ammonium or organic ammonium ion. The hydrophobic unit is a unit free of a hydrophilic group such as an anionic group. The hydrophobic unit may be formed by, for example, polymerizing the hydrophobic monomer free of a hydrophilic group such as anionic group. Specific examples of the hydrophobic monomer may include: monomers each having an aromatic ring, such as styrene, α-methylstyrene and benzyl (meth)acrylate; and (meth)acrylic acid ester-based monomers, such as methyl (meth)acrylate, butyl (meth)acrylate and 2-ethylhexyl (meth)acrylate.

The urethane-based resin may be obtained by, for example, causing a polyisocyanate and a polyol to react with each other. In addition, a chain extender may be further caused to react with the reaction product. Examples of the olefin-based resin may include polyethylene and polypropylene.

[Properties of Resin]

The phrase "resin is water-soluble" as used herein means that when the resin is neutralized with an alkali whose amount is equivalent to its acid value, the resin is present in an aqueous medium under a state in which the resin does not form any particle whose particle diameter may be measured by a dynamic light scattering method. Whether or not the resin is water-soluble can be judged in accordance with the following method. First, a liquid (resin solid content: 10% by mass) containing the resin neutralized with an alkali (e.g., sodium hydroxide or potassium hydroxide) corresponding to its acid value is prepared. Next, the prepared liquid is diluted with pure water tenfold (on a volume basis) to prepare a sample solution. Then, when no particle having a particle diameter is measured at the time of the measurement of the particle diameter of the resin in the sample solution by the dynamic light scattering method, the resin can be judged to be water-soluble. Measurement conditions at this time may be set, for example, as follows: SetZero: 30 seconds; number of times of measurement: 3; and measurement time: 180 seconds. In addition, a particle size analyzer based on the dynamic light scattering method (e.g., an analyzer available under the product name "UPA-EX150" from Nikkiso Co., Ltd.) or the like may be used as a particle size distribution measuring device. Of course, the particle size distribution measuring device to be used, the measurement conditions and the like are not limited to the foregoing.

The acid value of the water-soluble resin is preferably 100 mgKOH/g or more to 250 mgKOH/g or less. The weight-average molecular weight of the water-soluble resin is preferably 3,000 or more to 15,000 or less.

The acid value of a resin for forming the resin particle is preferably 5 mgKOH/g or more to 100 mgKOH/g or less. The weight-average molecular weight of the resin for forming the resin particle is preferably 1,000 or more to 3,000,000 or less, more preferably 100,000 or more to 3,000,000 or less. The volume-based 50% cumulative particle diameter ($D_{50}$) of the resin particle measured by a dynamic light scattering method is preferably 50 nm or more to 500 nm or less. The volume-based 50% cumulative particle diameter of the resin particle is the diameter of the particle in a particle diameter cumulative curve at which the ratio of the particle integrated from small particle diameters reaches 50% with respect to the total volume of the measured particle. The volume-based 50% cumulative particle diameter of the resin particle may be measured with the above-mentioned particle size analyzer of a dynamic light scattering system and under the above-mentioned measurement conditions. The glass transition temperature of the resin particle is preferably 40° C. or more to 120° C. or less, more preferably 50° C. or more to 100° C. or less. The glass transition temperature (° C.) of the resin particle may be measured with a differential scanning calorimeter (DSC). The resin particle does not need to include any coloring material.

[Wax Particle]

A particle formed of a wax (wax particle) may be incorporated into the ink. The use of the ink including the wax particle can record an image further improved in abrasion resistance. The wax in this specification may be a composition blended with a component except the wax or may be the wax itself. The wax particle may be dispersed with a dispersant, such as a surfactant or a resin. The waxes may be used alone or in combination thereof. The content (% by mass) of the wax particle in the ink is preferably 0.1% by mass or more to 10.0% by mass or less, more preferably 1.0% by mass or more to 5.0% by mass or less with respect to the total mass of the ink.

The wax is an ester of a higher monohydric or dihydric alcohol that is insoluble in water and a fatty acid in a narrow sense. Accordingly, animal-based waxes and plant-based waxes are included in the category of the wax but oils and fats are not included therein. High-melting point fats, mineral-based waxes, petroleum-based waxes and blends and modified products of various waxes are included therein in a broad sense. In the present invention, the waxes in a broad sense may each be used without any particular limitation. The waxes in a broad sense may be classified into natural waxes, synthetic waxes, blends thereof (blended waxes) and modified products thereof (modified waxes).

Examples of the natural wax may include: animal-based waxes, such as beeswax, a spermaceti wax and lanolin; plant-based waxes, such as a Japan wax, a carnauba wax, a sugar cane wax, a palm wax, a candelilla wax and a rice wax; mineral-based waxes such as a montan wax; and petroleum-based waxes, such as a paraffin wax, a microcrystalline wax and petrolatum. Examples of the synthetic wax may include hydrocarbon-based waxes, such as a Fischer-Tropsch wax and polyolefin waxes (e.g., polyethylene wax and polypropylene wax). The blended waxes are mixtures of the above-mentioned various waxes. The modified waxes are obtained by subjecting the above-mentioned various waxes to modification treatment, such as oxidation, hydrogenation, alcohol modification, acrylic modification or urethane modification. The above-mentioned waxes may be used alone or in combination thereof. The wax is preferably at least one kind selected from the group consisting of: a microcrystalline wax; a Fischer-Tropsch wax; a polyolefin wax; a paraffin wax; and modified products and blends thereof. Of those, a blend of a plurality of kinds of waxes is more preferred and a blend of a petroleum-based wax and a synthetic wax is particularly preferred.

The wax is preferably a solid at normal temperature (25° C.). The melting point (° C.) of the wax is preferably 40° C. or more to 120° C. or less, more preferably 50° ° C. or more to 100° C. or less. The melting point of the wax may be measured in conformity with a test method described in the section 5.3.1 (Melting Point Testing Method) of JIS K 2235:1991 (Petroleum Waxes). In the cases of a microcrystalline wax, petrolatum and a mixture of a plurality of kinds of waxes, their melting points may be measured with higher accuracy by utilizing a test method described in the section 5.3.2 thereof. The melting point of the wax is susceptible to characteristics, such as a molecular weight (a larger molecular weight provides a higher melting point), a molecular structure (a linear structure provides a higher melting point but a branched structure provides a lower melting point), crystallinity (higher crystallinity provides a higher melting point) and a density (a higher density provides a higher melting point). Accordingly, the control of those characteristics can provide a wax having a desired melting point. The melting point of the wax in the ink may be measured, for example, as follows: after the wax fractionated by subjecting the ink to ultracentrifugation treatment has been washed and dried, its melting point is measured in conformity with each of the above-mentioned test methods.

[Aqueous Medium]

The ink to be used in the recording method of the present invention is an aqueous ink including at least water as an aqueous medium. An aqueous medium that is the water or a mixed solvent of the water and a water-soluble organic solvent may be incorporated into the ink. Deionized water or ion-exchanged water is preferably used as the water. The content (% by mass) of the water in the aqueous ink is preferably 50.0% by mass or more to 95.0% by mass or less with respect to the total mass of the ink. In addition, the content (% by mass) of the water-soluble organic solvent in the aqueous ink is preferably 2.0% by mass or more to 40.0% by mass or less with respect to the total mass of the ink. Solvents that may be used in an ink for ink jet, such as alcohols, (poly)alkylene glycols, glycol ethers, nitrogen-containing solvents and sulfur-containing solvents, may each be used as the water-soluble organic solvent. The water-soluble organic solvent preferably includes the specific water-soluble hydrocarbon compounds mentioned above that can be included in the reaction liquid. The water-soluble organic solvents may be used alone or in combination thereof.

[Other Component]

The ink may include various other components as required. Examples of other components may include various additives, such as an antifoaming agent, a surfactant, a pH adjustor, a viscosity modifier, a rust inhibitor, an antiseptic, a fungicide, an antioxidant and an anti-reducing agent. However, the ink is preferably free of the reactant to be incorporated into the reaction liquid.

[Physical Properties of Ink]

The ink is an aqueous ink to be applied to an ink jet system. Accordingly, from the viewpoint of reliability, it is preferred that the physical property values of the ink be appropriately controlled. Specifically, the surface tension of the ink at 25° C. is preferably 20 mN/m or more to 60 mN/m or less. In addition, the viscosity of the ink at 25° C. is preferably 1.0 mPa·s or more to 10.0 mPa·s or less. The pH of the ink at 25° C. is preferably 7.0 or more to 9.5 or less, more preferably 8.0 or more to 9.5 or less.

EXAMPLES

The present invention is described in more detail below by way of Examples and Comparative Examples. The present invention is by no means limited to Examples below without departing from the gist of the present invention. "Part(s)" and "%" with regard to the description of the amounts of components are by mass unless otherwise stated.

<Preparation of Reaction Liquid>

Respective components (unit: %) shown in Table 1 were mixed and sufficiently stirred, followed by filtration with a cellulose acetate filter having a pore size of 3.0 μm (manufactured by Advantec) under pressure. The term "ACETYLENOL E100" shown in Table 1 represents the product name of a surfactant manufactured by Kawaken Fine Chemicals Co., Ltd. In addition, "PAS-H-1L" is a product name of a cationic resin (diallyldimethylammonium chloride polymer, concentration: 28%) manufactured by Nittobo Medical Co., Ltd. In Table 1, each of the "Content (%) of reactant" and the "Content (%) of component that is solid at 25° C." does not include the amount of water for forming a hydrate of the polyvalent metal salt.

TABLE 1

Composition and property of the reaction liquids

| | Reaction liquid | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Magnesium sulfate heptahydrate | 25.0 | | | 20.0 | | 20.0 | 20.5 | 61.5 | 21.3 | 21.3 | 61.5 | 49.8 | | 4.0 |
| Magnesium Nitrate Hexahydrate | | 26.0 | | | | | | | | | | | | |
| Calcium Nitrate Tetrahydrate | | | 24.0 | | | | | | | | | | 35.0 | |
| PAS-H-1L | | | | 3.6 | | | | | | | | | | |
| Malic acid | | | | | 13.5 | | | | | | | | | |
| L-Arginine | 15.0 | 15.0 | 15.0 | 15.0 | 23.0 | 15.0 | 15.0 | 15.0 | 9.4 | 9.6 | 20.0 | | | |
| Glycine | | | | | | | | | | | | | | |
| Glycerin | 8.0 | 8.0 | 8.0 | 8.0 | | 8.0 | 8.0 | 8.0 | 13.6 | 13.4 | 3.0 | 23.0 | 23.0 | |
| 2-Pyrrolidone | | | | | | | | | | | | | | 15.0 |
| 1,2-Hexanediol | | | | | | | | | | | | | | 5.0 |
| 1,3-Butanediol | | | | | | | | | | | | | | 5.0 |
| Acetylenol E100 | 1.0 | 1.0 | 1.0 | 1.0 | 1.0 | 1.0 | 1.0 | 1.0 | 1.0 | 1.0 | 3.0 | 1.0 | 1.0 | 2.0 |
| Ion-exchanged water | 51.0 | 50.0 | 52.0 | 52.4 | 62.5 | 56.0 | 55.5 | 14.5 | 54.7 | 54.7 | 12.5 | 26.2 | 41.0 | 69.0 |
| Content of water (%) | 63.8 | 61.0 | 59.3 | 62.6 | 62.5 | 66.2 | 66.0 | 46.0 | 65.6 | 65.6 | 44.0 | 51.7 | 51.7 | 71.0 |
| Content of reactant (%) | 12.2 | 15.0 | 16.7 | 10.8 | 13.5 | 9.8 | 10.0 | 30.0 | 10.4 | 10.4 | 30.0 | 24.3 | 24.3 | 2.0 |
| Content of solid reactant at 25° C. (%) | 12.2 | 15.0 | 16.7 | 10.8 | 0.0 | 9.8 | 10.0 | 30.0 | 10.4 | 10.4 | 30.0 | 24.3 | 24.3 | 2.0 |
| Content of solid component (%) | 27.2 | 30.0 | 31.7 | 25.8 | 23.0 | 24.8 | 25.0 | 45.0 | 19.8 | 20.0 | 50.0 | 24.3 | 24.3 | 2.0 |

<Preparation of Pigment Dispersion Liquid>

(Pigment Dispersion Liquid 1)

A styrene-ethyl acrylate-acrylic acid copolymer (resin 1) having an acid value of 150 mgKOH/g and a weight-average molecular weight of 8,000 was prepared. 20.0 Parts of the resin 1 was neutralized with potassium hydroxide of which molar amount was equivalent to the acid value of the resin 1. In addition, an appropriate amount of pure water was added to the neutralized product to prepare an aqueous solution of the resin 1 in which the content of the resin (solid content) was 20.00%. 20.0 Parts of a pigment (C.I. Pigment Blue 15:3), 50.0 parts of the aqueous solution of the resin 1 and 30.0 parts of pure water were mixed to provide a mixture. The resultant mixture was subjected to 50 passes of dispersion treatment with a nanomizer (manufactured by Yoshida Kikai Co., Ltd.) at a pressure of 150 MPa. After that, the treated product was centrifuged at a number of revolutions of 5,000 rpm for 30 minutes so that a coarse particle was removed. The residue was filtered with a cellulose acetate filter having a pore size of 3.0 μm (manufactured by Advantec) under pressure to prepare a pigment dispersion liquid 1 in which the content of the pigment was 20.0% and the content of the resin dispersant (resin 1) was 10.0%.

(Pigment Dispersion Liquid 2)

A pigment dispersion liquid 2 in which the content of a pigment was 20.0% and the content of a resin dispersant (resin 1) was 10.0% was prepared by the same procedure as that of the above-mentioned pigment dispersion liquid 1 except that the pigment was changed to a solid solution containing C.I. Pigment Violet 19 and C.I. Pigment Red 122.

(Pigment Dispersion Liquid 3)

A pigment dispersion liquid 3 in which the content of a pigment was 20.0% and the content of a resin dispersant (resin 1) was 10.0% was prepared by the same procedure as that of the above-mentioned pigment dispersion liquid 1 except that the pigment was changed to C.I. Pigment Yellow 74.

(Pigment Dispersion Liquid 4)

A pigment dispersion liquid 4 in which the content of a pigment was 20.0% and the content of a resin dispersant (resin 1) was 10.0% was prepared by the same procedure as that of the above-mentioned pigment dispersion liquid 1 except that the pigment was changed to carbon black.

(Pigment Dispersion Liquid 5)

An aqueous solution obtained by dissolving 5.0 g of concentrated hydrochloric acid in 5.5 g of water was brought into the state of being cooled to 5° C., followed by the addition of 1.5 g of 4-aminophthalic acid to the solution. Next, a container containing the aqueous solution was loaded into an ice bath, and while the solution was stirred so that its temperature was held at 10° C. or less, a solution obtained by dissolving 0.9 g of sodium nitrite in 9.0 g of ion-exchanged water at 5° C. was added thereto. After the mixture had been stirred for 15 minutes, 6.0 g of carbon black was added to the mixture under stirring and the whole was further stirred for 15 minutes to provide a slurry. The resultant slurry was filtered with filter paper (product name: "STANDARD FILTER PAPER No. 2," manufactured by Advantec), and particle remaining on the filter paper were sufficiently washed with water and dried in an oven at 110° C. After that, a sodium ion was substituted with a potassium ion by an ion exchange method. Thus, a self-dispersible pigment in which a —$C_6H_3$—$(COOK)_2$ group was bonded to the particle surface of the pigment (carbon black) was obtained. The pigment content was adjusted by adding an appropriate amount of pure water to obtain a pigment dispersion liquid 5 having a pigment (carbon black) content of 20.0%.

<Preparation of Resin Particle>

0.2 Part of potassium persulfate and 74.0 parts of ion-exchanged water were mixed to prepare a solution. In addition, 19.0 parts of ethyl methacrylate, 5.0 parts of n-butyl methacrylate, 1.5 parts of methacrylic acid and 0.3 part of a reactive surfactant were mixed to prepare an emulsion. A surfactant available under the product name "ADEKA REASOAP ER-20" (manufactured by Adeka Corporation, nonionic surfactant, number of ethylene oxide groups: 20) was used as the reactive surfactant. Under a nitrogen atmosphere, the emulsion was dropped into the solution over 1 hour and the mixture was subjected to a polymerization reaction while being stirred at 80° C. After that, the polymer was further stirred for 2 hours. After the polymer had been cooled to room temperature, ion-exchanged water and an aqueous solution of potassium hydroxide were added to the polymer to provide a water dispersion liquid of each resin particle in which the content of the resin particle was 25%. The volume-based 50% cumulative particle diameter ($D_{50}$) of the resin particle was 100 nm and the glass transition temperature (Tg) thereof was 60° C.

[Volume-based 50% Cumulative Particle Diameter of Resin Particle]

The water dispersion liquid of the resin particle was diluted with pure water. Thus, a liquid containing the resin particle in which the content of the resin particle was 1.0% was prepared as a measurement sample. The volume-based 50% cumulative particle diameter ($D_{50}$ (nm)) of the resin particle in the measurement sample was measured with a particle size distribution meter based on a dynamic light scattering method (product name: "NANOTRAC UPA-EX150", manufactured by Nikkiso Co., Ltd.). Measurement conditions were set as follows: SetZero: 30 seconds; number of times of measurement: 3; measurement time: 180 seconds; shape: perfect spherical shape; and refractive index: 1.6.

[Glass Transition Temperature]

A resin obtained by drying the water dispersion liquid of the resin particle was prepared as a sample. A temperature increase cycle in which the temperature of the resin was increased from −70° C. to 180° C. at a rate of 10° C./min with a differential scanning calorimeter (product name: "Q200", manufactured by TA Instruments) was performed twice to measure the glass transition temperature (Tg (° C.)) of the resin particle.

<Preparation of Ink>

Respective components (unit: %) shown in Table 2 were mixed and sufficiently stirred, followed by filtration with a cellulose acetate filter having a pore size of 3.0 μm (manufactured by Advantec) under pressure to prepare each ink. The term "ACETYLENOL E100" represents the product name of a surfactant manufactured by Kawaken Fine Chemicals Co., Ltd.

TABLE 2

Composition of the inks

| | Ink | | | | |
|---|---|---|---|---|---|
| | 1 | 2 | 3 | 4 | 5 |
| Pigment dispersion liquid 1 | 20.0 | | | | |
| Pigment dispersion liquid 2 | | 20.0 | | | |
| Pigment dispersion liquid 3 | | | 20.0 | | |
| Pigment dispersion liquid 4 | | | | 20.0 | |
| Pigment dispersion liquid 5 | | | | | 20.0 |
| Water dispersion liquid of Resin particle | 40.0 | 40.0 | 40.0 | 40.0 | 40.0 |
| Glycerin | 15.0 | 15.0 | 15.0 | 15.0 | 15.0 |
| Trimethylglycine | 4.5 | 4.5 | 4.5 | 4.5 | 4.5 |
| 1,2-Hexanediol | 0.5 | 0.5 | 0.5 | 0.5 | 0.5 |
| Acetylenol E100 | 0.5 | 0.5 | 0.5 | 0.5 | 0.5 |
| Ion-exchanged water | 19.5 | 19.5 | 19.5 | 19.5 | 19.5 |

<Evaluation>

The ink jet recording apparatus 100 having a configuration illustrated in FIG. 1 was prepared. An ink and a reaction liquid whose kinds were shown in Table 3-1 and Table 3-2 were filled into the ink applying device and the reaction liquid applying device, respectively. Then, images were recorded on the recording medium in accordance with evaluation conditions shown in Table 3-1 and Table 3-2 and ejection stability of the reaction liquid and cockling of the image were evaluated. In the present invention, in the following evaluation criteria, while ranks "AA", "A" and "B" were defined as acceptable levels, a rank "C" was defined as an unacceptable level. The evaluation results are shown in Table 3-1 and Table 3-2.

As the reaction liquid applying device (ejection head) configured to eject the reaction liquid, a reaction liquid applying device having an ejection amount per droplet of 3.0 ng and having a configuration illustrated in FIG. 4 was used. That is, the ejection head includes a first reaction liquid flow path and a second reaction liquid flow path. The first reaction liquid flow path is a flow path that is connected from the connection portion (inflow portion) 1507 to the connection portion (outflow portion) 1507 going through the liquid chamber 1508 of the ejection element substrate 1203. The second reaction liquid flow path is a flow path that is connected from the connection portion (inflow portion) 1507 to the connection portion (outflow portion) 1507 without going through the liquid chamber 1508 of the ejection element substrate 1203. In addition, when the operation of the negative pressure control unit 1509 illustrated in FIG. 4 is turned "ON" or "OFF", a pressure difference was set between the reaction liquids that flow in the first reaction liquid flow path and the second reaction liquid flow path. Further, the flow rate of the reaction liquid in the first reaction liquid flow path was controlled by adjusting the pressure by the negative pressure control unit. Also as the ink applying device (ejection head) configured to eject an ink, an ink applying device having the same configuration as that of the reaction liquid applying device was used. A speed at which the recording medium was conveyed was set to 0.5 m/s. The temperature of a heating portion 2000 was set to 60° C. and the air speed thereof was set to 10 m/s. The temperature of a fixing member 3100 of a fixing portion 3000 was set to 80° C. and the temperature of a cooling portion 4000 was set to 30° C.

In Example 5, an image was recorded by ejecting the reaction liquid under the condition that the operation of the negative pressure control unit 1509 illustrated in FIG. 4 was turned off, a pump (not shown) was actuated in each of the first reaction liquid flow path and the second reaction liquid flow path and the reaction liquid was flowed without utilization of the pressure difference. In each of Comparative Examples 1 to 3, an image was recorded by ejecting the reaction liquid under the condition that the second reaction liquid flow path was closed and the reaction liquid was flowed only in the first reaction liquid flow path.

(Ejection Stability)

Under the condition that the application amount of the reaction liquid and the application amount of the ink were set to 2 g/m$^2$ and 8 g/m$^2$, respectively, the reaction liquid and the ink were each ejected in accordance with evaluation conditions shown in Table 3-1 and Table 3-2 to be applied to a recording medium 1 so that a region to which the aqueous ink is applied and a region to which the reaction liquid is applied are at least partially overlap on the recording medium. Thus, a solid image having a size of 30 cm×5 cm was continuously recorded on 1,000 sheets. Plain paper having a B3 size (product name: "npi HIGH QUALITY", manufactured by Nippon Paper Industries Co., Ltd., basis weight: 64 g/m$^2$) was used as the recording medium 1. Next, under the condition that the application amount of the reaction liquid was set to 2 g/m$^2$ and no ink was applied, an image including a lattice pattern for observing the ejection state of the ink from the respective ejection orifices each configured to eject the reaction liquid was recorded on a recording medium 2. A polyester film having an A3 size (product name: "O.H.P. Film WPO-A3P", manufactured by Sakae Technical Paper Co., Ltd., thickness: 100 μm) was used as the recording medium 2. A cycle of the recording of the solid image on the 1,000 sheets and the image including a lattice pattern was performed 20 times in total. For the image including a lattice pattern recorded in the 20th cycle, the ejection state of the ink from the respective ejection orifices was observed. The ratio (%) of ejection orifices in each of which non-ejection occurred was calculated and the ejection stability of the reaction liquid was evaluated in accordance with the following evaluation criteria from an average value of the images on the 20 sheets.

AA: The ratio of ejection orifices in each of which non-ejection occurred was 0.00%.

A: The ratio of ejection orifices in each of which non-ejection occurred was more than 0.00% to 0.01% or less.

B: The ratio of ejection orifices in each of which non-ejection occurred was more than 0.01% to 0.10% or less.

C: The ratio of ejection orifices in each of which non-ejection occurred was more than 0.10%.

(Cockling Suppression)

Plain paper having a B3 size (product name: "npi HIGH QUALITY", manufactured by Nippon Paper Industries Co., Ltd., basis weight: 64 g/m$^2$) was used as the recording medium and each of the following two kinds of solid images having a size of 18 cm in a longitudinal direction of a line head×2 cm in a conveyance direction of the recording medium was recorded thereon. That is, a solid image obtained by setting the application amount of the reaction liquid to 2 g/m$^2$ and the application amount of the ink to 8 g/m$^2$ to set the total application amount to 10 g/m$^2$ and a solid image obtained by setting the application amount of the reaction liquid to 2 g/m$^2$ and the application amount of the ink to 6 g/m$^2$ to set the total application amount to 8 g/m$^2$ were recorded. Each of the resultant recorded products was placed on a horizonal plane and the deformation in a corrugated shape (cockling) of the recording medium after the lapse of 30 seconds from the recording was visually observed from diagonally above and the state of cockling was observed. Cockling suppression was evaluated in accordance with the following evaluation criteria. When the application amount of the liquid is increased, the cockling is liable to occur and the degree of corrugation is increased. Thus, the fact that no cockling is observed even when the application amount of the liquid is increased indicates that the occurrence of the cockling is suppressed.

A: No cockling was observed even in the solid image in which the total application amount of the reaction liquid and the ink was 10 g/m$^2$.

B: Although the cockling was observed in the solid image in which the total application amount of the reaction liquid and the ink was 10 g/m$^2$, no cockling was observed in the solid image in which the total application amount of the reaction liquid and the ink was 8 g/m$^2$.

C: The cockling was observed in the solid image in which the total application amount of the reaction liquid and the ink was 8 g/m$^2$.

TABLE 3-1

| Evaluation condition and evaluation result | | | | | | | | | |
|---|---|---|---|---|---|---|---|---|---|
| | | Evaluation condition | | | | | | Evaluation result | |
| | | Reaction liquid | Ink | Reaction liquid flow path | Pressure difference | Flow rate of reaction liquid in the first reaction liquid flow path (mm/s) | Temperature of reaction liquid in ejection head (° C.) | Ejection Stability | Cockling suppression |
| Example | 1 | 1 | 1 | First and Second | Yes | 10 | 40 | AA | A |
| | 2 | 2 | 1 | First and Second | Yes | 10 | 40 | AA | A |
| | 3 | 3 | 1 | First and Second | Yes | 10 | 40 | AA | A |
| | 4 | 4 | 1 | First and Second | Yes | 10 | 40 | AA | A |
| | 5 | 1 | 1 | First and Second | None | — | 40 | B | A |
| | 6 | 1 | 1 | First and Second | Yes | 0.05 | 40 | B | A |
| | 7 | 1 | 1 | First and Second | Yes | 0.1 | 40 | AA | A |
| | 8 | 1 | 1 | First and Second | Yes | 1 | 40 | AA | A |
| | 9 | 1 | 1 | First and Second | Yes | 100 | 40 | AA | A |
| | 10 | 1 | 1 | First and Second | Yes | 120 | 40 | A | A |
| | 11 | 1 | 1 | First and Second | Yes | 10 | 25 | A | A |
| | 12 | 1 | 1 | First and Second | Yes | 10 | 30 | AA | A |
| | 13 | 1 | 1 | First and Second | Yes | 10 | 50 | AA | A |
| | 14 | 1 | 1 | First and Second | Yes | 10 | 60 | B | A |
| | 15 | 5 | 1 | First and Second | Yes | 10 | 40 | AA | B |
| | 16 | 6 | 1 | First and Second | Yes | 10 | 40 | AA | B |

TABLE 3-2

| Evaluation condition and evaluation result | | | | | | | | | |
|---|---|---|---|---|---|---|---|---|---|
| | | Evaluation condition | | | | | | Evaluation result | |
| | | Reaction liquid | Ink | Reaction liquid flow path | Pressure difference | Flow rate of reaction liquid in the first reaction liquid flow path (mm/s) | Temperature of reaction liquid in ejection head (° C.) | Ejection Stability | Cockling suppression |
| Example | 17 | 7 | 1 | First and Second | Yes | 10 | 40 | AA | A |
| | 18 | 8 | 1 | First and Second | Yes | 10 | 40 | AA | A |
| | 19 | 9 | 1 | First and Second | Yes | 10 | 40 | AA | B |
| | 20 | 10 | 1 | First and Second | Yes | 10 | 40 | AA | A |
| | 21 | 11 | 1 | First and Second | Yes | 10 | 40 | AA | A |
| | 22 | 12 | 1 | First and Second | Yes | 10 | 40 | AA | B |
| | 23 | 13 | 1 | First and Second | Yes | 10 | 40 | AA | B |

TABLE 3-2-continued

| | | | | | | | | | |
|---|---|---|---|---|---|---|---|---|---|
| Evaluation condition and evaluation result | | | | | | | | | |
| | | Evaluation condition | | | | | | Evaluation result | |
| | | Reaction liquid | Ink | Reaction liquid flow path | Pressure difference | Flow rate of reaction liquid in the first reaction liquid flow path (mm/s) | Temperature of reaction liquid in ejection head (° C.) | Ejection Stability | Cockling suppression |
| | 24 | 14 | 1 | First and Second | Yes | 10 | 40 | AA | B |
| | 25 | 1 | 2 | First and Second | Yes | 10 | 40 | AA | A |
| | 26 | 1 | 3 | First and Second | Yes | 10 | 40 | AA | A |
| | 27 | 1 | 4 | First and Second | Yes | 10 | 40 | AA | A |
| | 28 | 1 | 5 | First and Second | Yes | 10 | 40 | AA | A |
| Comparative example | 1 | 1 | 1 | First | Yes | 10 | 40 | C | A |
| | 2 | 5 | 1 | First | Yes | 10 | 40 | C | B |
| | 3 | 14 | 1 | First | Yes | 10 | 40 | C | B |

According to the present invention, there can be provided the ink jet recording method including using an aqueous ink and a reaction liquid, in which ejection stability of the reaction liquid is excellent and a high-quality image can be recorded. In addition, according to the present invention, the ink jet recording apparatus to be used in the ink jet recording method can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-188250, filed Nov. 25, 2022, and Japanese Patent Application No. 2023-191906, filed Nov. 10, 2023, which are hereby incorporated by reference herein in their entirety.

What is claimed is:

1. A method for suppressing a physical property change of a reaction liquid in an ink jet recording apparatus for recording an image on a recording medium with an aqueous ink and an aqueous reaction liquid containing a reactant that reacts with the aqueous ink, the recording apparatus comprising an ejection head of an ink jet system including:

an ejection element substrate including a liquid chamber having an ejection orifice configured to eject the reaction liquid filled inside thereof; and a circulation flow path configured to circulate the reaction liquid between an inside and an outside of the liquid chamber going through the liquid chamber, and wherein the circulation flow path comprises:

an inflow portion configured to flow the reaction liquid into the ejection element substrate;

an outflow portion configured to flow the reaction liquid out of the ejection element substrate;

a first reaction liquid flow path that is connected from the inflow portion to the outflow portion going through the liquid chamber; and a second reaction liquid flow path that is branched from the first reaction liquid flow path and is connected from the inflow portion to the outflow portion without going through the liquid chamber, wherein the method comprises:

a reaction liquid applying step of applying the reaction liquid to the recording medium by ejecting the reaction liquid from the ejection head;

an ink applying step of applying the aqueous ink to the recording medium so that a region to which the aqueous ink is applied and a region to which the reaction liquid is applied at least partially overlap on the recording medium; and a circulation step of circulating the reaction liquid in the circulation flow path of the ejection head, including joining the reaction liquid flowing out from the first reaction liquid flow path and the reaction liquid flowing out from the second reaction liquid flow path.

2. The method for suppressing a physical property change of a reaction liquid according to claim 1, wherein the reaction liquid that flows in the first reaction liquid flow path has a higher pressure than a pressure of the reaction liquid that flows in the second reaction liquid flow path.

3. The method for suppressing a physical property change of a reaction liquid according to claim 1, wherein the reaction liquid that flows in the first reaction liquid flow path has a flow rate of 0.1 mm/s or more to 100.0 mm/s or less.

4. The method for suppressing a physical property change of a reaction liquid according to claim 1, wherein the reactant is a component that is solid at 25° C.

5. The method for suppressing a physical property change of a reaction liquid according to claim 4, wherein a content (% by mass) of the reactant in the reaction liquid is 10.0% by mass or more with respect to a total mass of the reaction liquid.

6. The method for suppressing a physical property change of a reaction liquid according to claim 1, wherein a content (% by mass) of a component that is solid at 25° C. in the reaction liquid is 20.0% by mass or more with respect to a total mass of the reaction liquid.

7. The method for suppressing a physical property change of a reaction liquid according to claim 1, wherein the ejection head is a line type ejection head.

8. The method for suppressing a physical property change of a reaction liquid according to claim 1, wherein the first reaction liquid flow path merges with the second reaction liquid flow path downstream of the liquid chamber and is connected to the outflow portion.

9. The method for suppressing a physical property change of a reaction liquid according to claim 1, wherein the reaction liquid that flows in the ejection head has a temperature of 30° C. or more to 50° C. or less.

10. An ink jet recording method for recording an image on a recording medium with an aqueous ink and an aqueous reaction liquid containing a reactant that reacts with the aqueous ink, the method comprising:

a reaction liquid applying step of applying the reaction liquid to the recording medium by ejecting the reaction liquid from an ejection head of an ink jet system; and an ink applying step of applying the aqueous ink to the recording medium so that a region to which the aqueous ink is applied and a region to which the reaction liquid is applied at least partially overlap on the recording medium, wherein the ejection head comprises:

an ejection element substrate including a liquid chamber having an ejection orifice configured to eject the reaction liquid filled inside thereof, and a circulation flow path configured to circulate the reaction liquid between an inside and an outside of the liquid chamber going through the liquid chamber, and wherein the circulation flow path comprises:

an inflow portion configured to flow the reaction liquid into the ejection element substrate;

an outflow portion configured to flow the reaction liquid out of the ejection element substrate;

a first reaction liquid flow path that is connected from the inflow portion to the outflow portion going through the liquid chamber; and a second reaction liquid flow path that is branched from the first reaction liquid flow path and is connected from the inflow portion to the outflow portion without going through the liquid chamber, whereby a physical property change of the reaction liquid is suppressed.

* * * * *